US012809114B2

(12) United States Patent
Huang et al.

(10) Patent No.: US 12,809,114 B2
(45) Date of Patent: Nov. 24, 2026

(54) OPTICAL IMAGING LENS ASSEMBLY

(71) Applicant: Zhejiang Sunny Optics Co., Ltd, Yuyao City (CN)

(72) Inventors: Congchun Huang, Yuyao City (CN); Yabin Hu, Yuyao City (CN); Xiuxun Dou, Yuyao City (CN); Jianke Wenren, Yuyao City (CN); Fujian Dai, Yuyao City (CN); Liefeng Zhao, Yuyao City (CN)

(73) Assignee: Zhejiang Sunny Optics Co., Ltd., Yuyao City (CN)

( * ) Notice: Subject to any disclaimer, the term of this patent is extended or adjusted under 35 U.S.C. 154(b) by 524 days.

(21) Appl. No.: 18/302,370

(22) Filed: Apr. 18, 2023

(65) Prior Publication Data

US 2023/0251473 A1 Aug. 10, 2023

(30) Foreign Application Priority Data

Nov. 30, 2022 (CN) ......................... 202211522557.2

(51) Int. Cl.

| | |
|---|---|
| ***G02B 7/02*** | (2021.01) |
| ***G02B 9/60*** | (2006.01) |
| ***G02B 13/00*** | (2006.01) |
| ***G02B 15/14*** | (2006.01) |
| ***G03B 30/00*** | (2021.01) |
| *G02B 9/62* | (2006.01) |
| *G02B 9/64* | (2006.01) |

(52) U.S. Cl.

CPC ............... *G02B 7/026* (2013.01); *G02B 7/02* (2013.01); *G02B 7/021* (2013.01); *G02B 9/60* (2013.01); *G02B 13/0045* (2013.01); *G02B 15/146* (2019.08); *G02B 9/62* (2013.01); *G02B 9/64* (2013.01); *G03B 30/00* (2021.01)

(58) Field of Classification Search

CPC .............. G02B 9/60; G02B 9/62; G02B 9/64; G02B 13/0045; G02B 7/02; G02B 7/026; G02B 7/021

See application file for complete search history.

(56) References Cited

U.S. PATENT DOCUMENTS

| | | | | |
|---|---|---|---|---|
| 2019/0391365 A1* | 12/2019 | Son | .......................... | G02B 9/64 |
| 2020/0409108 A1* | 12/2020 | Ma | ......................... | G02B 7/022 |
| 2021/0318519 A1* | 10/2021 | Ma | ......................... | G02B 13/18 |
| 2022/0066151 A1* | 3/2022 | Guo | ......................... | G02B 9/60 |

FOREIGN PATENT DOCUMENTS

CN 217213281 U 8/2022

OTHER PUBLICATIONS

Communication dated Feb. 6, 2026, in Indian Application No. 202314080758.

* cited by examiner

*Primary Examiner* — Ricky L Mack
*Assistant Examiner* — Natasha Nigam
(74) *Attorney, Agent, or Firm* — Sughrue Mion, PLLC

(57) ABSTRACT

The present disclosure discloses an optical imaging lens assembly. The optical imaging lens assembly comprises: an imaging lens group, composed of a first lens, a second lens, a third lens, a fourth lens and a fifth lens that are sequentially arranged along an optical axis from an object side to an image side; a fourth spacing elements; and a lens barrel, forming an accommodation space in which the imaging lens group and the fourth spacing elements are accommodated. The lens barrel comprises an object-end surface close to the object side, an image-end surface close to the image side, an inner wall and an outer wall.

17 Claims, 8 Drawing Sheets

OPTICAL IMAGING LENS ASSEMBLY

CROSS-REFERENCE TO RELATED APPLICATIONS

This application claims the priority from Chinese Patent Application No. 202211522557.2, filed in the National Intellectual Property Administration (CNIPA) on Nov. 30, 2022, the content of which is hereby incorporated by reference in its entirety.

TECHNICAL FIELD

The present disclosure relates to the field of optical element, and specifically to an optical imaging lens assembly.

BACKGROUND

In recent years, with the popularity of electronic products such as mobile phones, tablet computers and smart watches in daily life, people have put forward higher and higher requirements on the photographing function of the electronic products. A wide-angle lens assembly is advantageous in a large field-of-view. In a multi-camera device, the wide-angle lens assembly is generally used as the main camera for taking pictures. Due to the large field-of-view, the wide-angle lens assembly has a large entrance pupil diameter, and thus, a central diaphragm is required, which will cause many difficulties in manufacturing. For example, the aperture of the lens group of the wide-angle lens assembly is relatively large, which requires a more reasonable match between a lens barrel structure and a lens to meet the demands of a wide-angle imaging system. However, in order to satisfy the large field-of-view, the existing wide-angle imaging lens assembly tends to ignore the need to make the overall structure as thin and light as possible, and at the same time, the lens assembly is prone to problems such as poor assembling stability and a poor imaging quality. Therefore, in order to achieve the demands of customers, a wide-angle lens assembly composed of five lenses is designed to realize the thin and light trend of devices without changing the imaging performance thereof. Accordingly, the lens assembly has a height reduced as much as possible, and at the same time, it is ensured that the assembling stability is realistic.

SUMMARY

The present disclosure provides an optical imaging lens assembly, and the optical imaging lens assembly comprises: an imaging lens group, composed of a first lens, a second lens, a third lens, a fourth lens and a fifth lens that are sequentially arranged along an optical axis from an object side to an image side; a fourth spacing element, placed on an image side of the fourth lens and is in contact with an image-side surface of the fourth lens; and a lens barrel, forming an accommodation space in which the imaging lens group and the fourth spacing elements are accommodated, wherein the lens barrel comprises an object-end surface close to the object side, an image-end surface close to the image side, an inner wall and an outer wall, wherein an outer diameter D0s of the object-end surface of the lens barrel, an inner diameter d0s of the object-end surface of the lens barrel, a radius of curvature R1 of an object-side surface of the first lens and a radius of curvature R2 of the image-side surface of the first lens satisfy: $|(R1+R2)/(D0s-d0s)|<30.0$, and a center thickness of the fourth lens on the optical axis is greater than 0.4 mm, and an effective focal length f4 of the fourth lens and an inner diameter d4s of an object-side surface of the fourth spacing element satisfy: $0<d4s/f4<5.0$.

In an implementation, the radius of curvature R1 of the object-side surface of the first lens and an outer diameter D1s of an object-side surface of a first spacing element satisfy: $-3.0<R1/D1s<-0.5$, wherein the first spacing element is placed on an image side of the first lens and is in contact with an image-side surface of the first lens; or a radius of curvature R7 of an object-side surface of the fourth lens and an outer diameter D4s of an object-side surface of the fourth spacing element satisfy: $-3.0<R7/D4s<-0.5$.

In an implementation, a center thickness of the second lens on the optical axis is greater than 0.4 mm, and an effective focal length f2 of the second lens and an inner diameter d2s of an object-side surface of a second spacing element satisfy: $0<d2s/f2<5.0$, wherein the second spacing element is placed on an image side of the second lens and is in contact with an image-side surface of the second lens.

In an implementation, a height L of the lens barrel along a direction of the optical axis, an effective focal length f5 of the fifth lens and a maximal field-of-view FOV of the optical imaging lens assembly satisfy: $100.0°<FOV<120.0°$ and $L/[f5\times\tan(FOV/2)]<-1.0$.

In an implementation, the radius of curvature R1 of the object-side surface of the first lens, the radius of curvature R2 of the image-side surface of the first lens, a radius of curvature R3 of an object-side surface of the second lens, a radius of curvature R4 of the image-side surface of the second lens, a radius of curvature R5 of an object-side surface of the third lens and a radius of curvature R6 of the image-side surface of the third lens satisfy: $|R1|>|R2|$, $R3>R4$, $R5>R6$ and $R3<R5$.

In an implementation, there is an air spacing between any two adjacent lenses in the first lens to the fifth lens on the optical axis, wherein an air spacing between the first lens and the second lens on the optical axis is greater than a spacing distance between an image-side surface of a first spacing element and the object-side surface of a second spacing element along the direction of the optical axis, wherein the first spacing element is placed on an image side of the first lens and is in contact with an image-side surface of the first lens, and the second spacing element is placed on an image side of the second lens and is in contact with an image-side surface of the second lens.

In an implementation, the radius of curvature R1 of the object-side surface of the first lens, the radius of curvature R2 of the image-side surface of the first lens, a distance EP01 from the object-end surface of the lens barrel to an object-side surface of a first spacing element along the direction of the optical axis, a center thickness CT1 of the first lens on the optical axis and an air spacing T12 between the first lens and the second lens on the optical axis satisfy: $0<(R1+R2)/EP01-(R1-R2)/(CT1+T12)<10.0$, wherein the first spacing element is placed on an image side of the first lens and is in contact with an image-side surface of the first lens.

In an implementation, an effective focal length f1 of the first lens, an outer diameter D1s of an object-side surface of a first spacing element and an inner diameter d1s of the object-side surface of the first spacing element satisfy: $-5.0<f1/(D1s-d1s)+f1/(D1s+d1s)<0$, wherein the first spacing element is placed on an image side of the first lens and is in contact with an image-side surface of the first lens.

In an implementation, the radius of curvature R2 of the image-side surface of the first lens, a radius of curvature R3 of an object-side surface of the second lens, an inner diameter d1m of an image-side surface of a first spacing element and an inner diameter d2m of an image-side surface of a second spacing element satisfy: $0<(R2+R3)/(d1m+d2m)<5.0$, wherein the first spacing element is placed on an image side of the first lens and is in contact with an image-side surface of the first lens, and the second spacing element is placed on an image side of the second lens and is in contact with an image-side surface of the second lens.

In an implementation, an inner diameter d1m of an image-side surface of a first spacing element, an effective focal length f1 of the first lens and the maximal field-of-view FOV of the optical imaging lens assembly satisfy: $-10.0<[f1\times\tan(FOV/2)]/d1m<0$, wherein the first spacing element is placed on an image side of the first lens and is in contact with an image-side surface of the first lens.

In an implementation, the effective focal length f1 of the first lens, an effective focal length f2 of the second lens, a spacing distance EP12 between the image-side surface of a first spacing element and an object-side surface of a second spacing element along the direction of the optical axis, a maximal thickness CP1 of the first spacing element along the direction of the optical axis and a maximal thickness CP2 of the second spacing element along the direction of the optical axis satisfy: $-20.0<f1/(EP12+CP1)-f2/(EP12+CP2)<-2.0$, wherein the first spacing element is placed on an image side of the first lens and is in contact with an image-side surface of the first lens, and the second spacing element is placed on an image side of the second lens and is in contact with an image-side surface of the second lens.

In an implementation, a refractive index N2 of the second lens, a refractive index N3 of the third lens, a maximal thickness CP2 of a second spacing element along the direction of the optical axis, a maximal thickness CP3 of a third spacing element along the direction of the optical axis and a spacing distance EP23 between the image-side surface of the second spacing element and an object-side surface of the third spacing element along the direction of the optical axis satisfy: $3.0<(N2+N3)/(EP23-CP2-CP3)<20.0$, wherein the second spacing element is placed on an image side of the second lens and is in contact with an image-side surface of the second lens, and the third spacing element is placed on an image side of the third lens and is in contact with an image-side surface of the third lens.

In an implementation, an outer diameter D2s of an object-side surface of a second spacing element, an inner diameter d2s of the object-side surface of the second spacing element, a center thickness CT2 of the second lens on the optical axis and a spacing distance EP12 between the image-side surface of a first spacing element and an object-side surface of the second spacing element along the direction of the optical axis satisfy: $2.0<(D2s+d2s)/(CT2+EP12)<9.0$, wherein the first spacing element is placed on an image side of the first lens and is in contact with an image-side surface of the first lens, and the second spacing element is placed on an image side of the second lens and is in contact with an image-side surface of the second lens.

In an implementation, an outer diameter D2m of the image-side surface of a second spacing element, an outer diameter D3s of an object-side surface of a third spacing element, a radius of curvature R4 of the image-side surface of the second lens and a radius of curvature R5 of an object-side surface of the third lens satisfy: $0<(D2m+D3s)/(R4+R5)<10.0$, wherein the second spacing element is placed on an image side of the second lens and is in contact with an image-side surface of the second lens, and the third spacing element is placed on an image side of the third lens and is in contact with an image-side surface of the third lens.

In an implementation, an outer diameter D1m of the image-side surface of a first spacing element, the radius of curvature R2 of the image-side surface of the first lens and the radius of curvature R3 of the object-side surface of the second lens satisfy: $1.0<D1m/R2+D1m/R3<3.0$, wherein the first spacing element is placed on an image side of the first lens and is in contact with an image-side surface of the first lens.

In an implementation, a front-end portion of the lens barrel close to the object side further comprises an aperture plane forming an inclination angle with the optical axis, the aperture plane is in connection with the object-end surface of the lens barrel, and an angle between the aperture plane and the object-end surface of the lens barrel is in a range of 100° to 130°.

In an implementation, an outer diameter D4s of an object-side surface of the fourth spacing element, an inner diameter d4s of the object-side surface of the fourth spacing element, a radius of curvature R8 of the image-side surface of the fourth lens, a radius of curvature R9 of an object-side surface of the fifth lens and a radius of curvature R10 of an image-side surface of the fifth lens satisfy: $1.0<(D4s+d4s)/(R9+R10-R8)<5.0$.

The optical imaging lens assembly provided in the present disclosure is a wide-angle lens composed of five lenses. The height of the lens assembly is reduced as much as possible without changing the imaging performance, and thus, the thin and light trend of the device is achieved, and at the same time, the assembling stability is ensured. On the one hand, disposing a protruding structure on the outer wall of the lens barrel is conducive to ensuring the uniformity of the wall thickness of the lens barrel during molding. The gate is located at a protrusion, which can reduce the influence of the gate on the appearance of the lens barrel. Moreover, the protruding structure is also conducive to fixing the lens assembly to the module side. On the other hand, by controlling the degrees of bending of the object-side and image-side surfaces of the first lens and the inner and outer diameters of the object-end surface of the lens barrel, a reasonable field-of-view is obtained, and the range of incident light from the side of a photographed object is controlled, thereby ensuring the quality of the optical imaging lens assembly. In addition, the height of the lens barrel along the direction of the optical axis is minimized by adjusting the effective focal length of the fifth lens and the maximal field-of view of the optical imaging lens assembly. Accordingly, it is implemented that the size of the lens assembly is reduced as much as possible without significantly weakening the optical performance, thereby achieving a thin and light device.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

Figure 1:
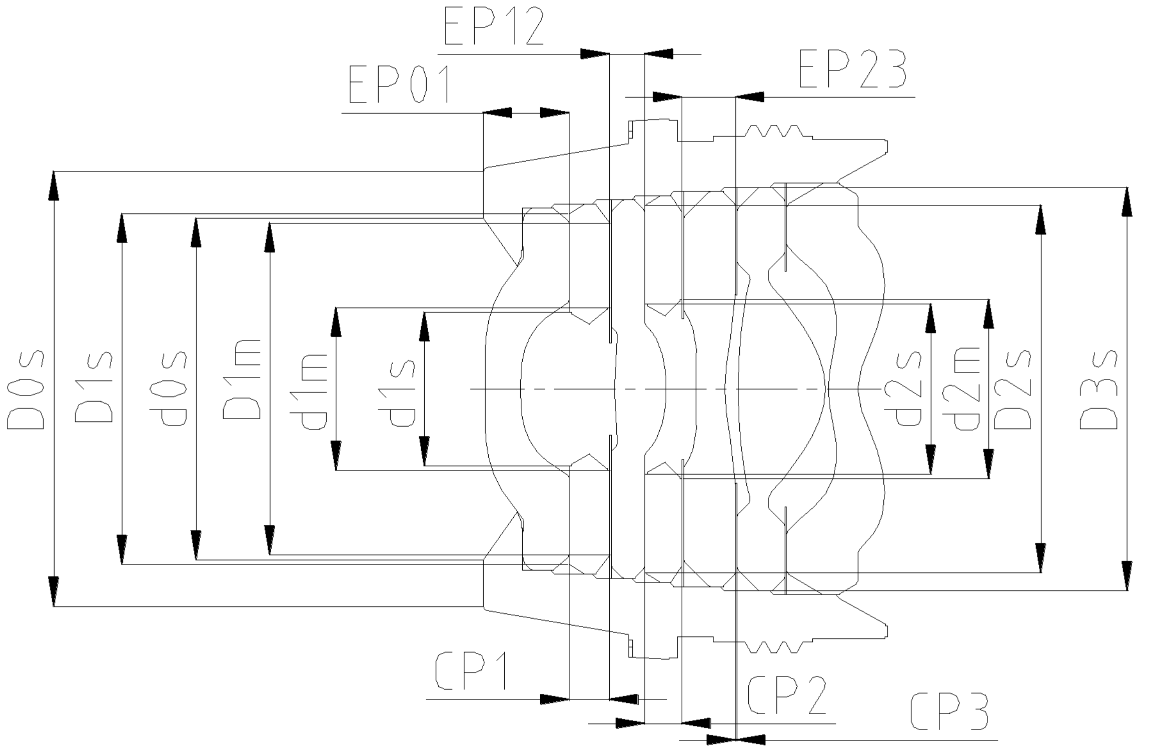
FIG. 1 is a structural layout diagram of an optical imaging lens assembly according to the present disclosure and a schematic diagram of some parameters.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a curvature or a paraxial curvature refers to a curvature of an area near an optical axis. If the curvature of a lens surface is positive and the position of the curvature is not defined, it represents that the lens surface has a positive curvature at least at the paraxial area. If the curvature of the lens surface is negative and the position of the curvature is not defined, it represents that the lens surface has a negative curvature at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, represents "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments only express several implementations of the present disclosure, and the description thereof is specific and detailed, but should not be construed as a limitation to the patent scope of the present disclosure. It should be noted that those skilled in the art can make several variations and improvements without departing from the concept of the present disclosure, and these variations and improvements all fall into the scope of protection of the present disclosure. For example, the lens groups (i.e., the first lens to the fifth lens), the lens barrel structures and the spacing elements in the embodiments of the present disclosure can be combined arbitrarily, and it is not limited that the lens group in one embodiment can only be combined with the lens barrel structure, the spacing element, etc. in this embodiment.

The present disclosure will be described below in detail with reference to the accompanying drawings and in combination with the embodiments. Here, FIG. 1 is a structural layout diagram of an optical imaging lens assembly according to the present disclosure and a schematic diagram of some parameters. It should be understood by those skilled in the art that some parameters (e.g., the center thickness CT1 of the first lens on the optical axis) frequently used in the art are not shown in FIG. 1, and FIG. 1 only shows some parameters of a lens barrel and spacing elements of an optical imaging lens assembly according to the present disclosure by examples, for a better understanding of the present disclosure. As shown in FIG. 1, EP01 represents a spacing distance between an object-end surface of a lens barrel close to an object side and an object-side surface of a first spacing element along a direction of an optical axis; EP12 represents a spacing distance between an image-side surface of the first spacing element and an object-side surface of a second spacing element along the direction of the optical axis; EP23 represents a spacing distance between an image-side surface of the second spacing element and an object-side surface of a third spacing element along the direction of the optical axis; CP1 represents a maximal thickness of the first spacing element along the direction of the optical axis; CP2 represents a maximal thickness of the second spacing element along the direction of the optical axis; CP3 represents a maximal thickness of the third spacing element along the direction of the optical axis; D1s represents an outer diameter of the object-side surface of the first spacing element; d1s represents an inner diameter of the object-side surface of the first spacing element; D0s represents an outer diameter of the object-end surface of the lens barrel close to the object side; d0s represents an inner diameter of the object-end surface of the lens barrel close to the object side; D1m represents an outer diameter of the image-side surface of the first spacing element; d1m represents an inner diameter of the image-side surface of the first spacing element; d2m represents an inner diameter of the image-side surface of the second spacing element; d2s represents an inner diameter of the object-side surface of the second spacing element; D2s represents an outer diameter of the object-side surface of the second spacing element; and D3s represents an outer diameter of an object-side surface of the third spacing element.

The optical imaging lens assembly according to exemplary implementations of the present disclosure includes an imaging lens group and a plurality of spacing elements. Here, the imaging lens group includes, sequentially along an optical axis from an object side to an image side: a first lens, a second lens, a third lens, a fourth lens and a fifth lens. Here, the first lens has a positive or negative refractive power, the second lens has a positive or negative refractive power, the third lens has a positive or negative refractive power, the fourth lens has a positive or negative refractive power, and the fifth lens has a positive or negative refractive power.

In the exemplary implementations, the plurality of spacing elements may include: a first spacing element that is placed on an image side of the first lens and is in contact with an image-side surface of the first lens, a second spacing element that is placed on an image side of the second lens and is in contact with an image-side surface of the second lens, a third spacing element that is placed on an image side of the third lens and is in contact with an image-side surface of the third lens, and a fourth spacing element that is placed on an image side of the fourth lens and is in contact with an image-side surface of the fourth lens.

It should be understood that the number of the spacing elements is not specifically limited in the present disclosure, any number of spacing elements may be included between any two lenses, and the entire optical imaging lens assembly may also include any number of spacing elements. The spacing elements help the optical imaging lens assembly to intercept unwanted refraction and reflection optical paths, thereby reducing the generation of stray light and ghost images. The addition of the auxiliary bearing between the spacing element and the lens barrel is conducive to improving the problems of poor assembling stability and low performance yield caused by the large segment difference between the lenses.

In the exemplary implementations, the optical imaging lens assembly further includes a lens barrel configured to accommodate the imaging lens group and the plurality of spacing elements. The lens barrel includes an object-end surface close to the object side, an image-end surface close to the image side, an inner wall and an outer wall.

In the exemplary implementations, the optical imaging lens assembly according to the present disclosure may satisfy: $|(R1+R2)/(D0s-d0s)|<30.0$, $100.0°<FOV<120.0°$ and $L/[f5\times\tan(FOV/2)]<-1.0$. Here, D0s is an outer diameter of the object-end surface of the lens barrel, d0s is an inner diameter of the object-end surface of the lens barrel, R1 is a radius of curvature of an object-side surface of the first lens, R2 is a radius of curvature of the image-side surface of the first lens, L is a height of the lens barrel along a direction of the optical axis, f5 is an effective focal length of the fifth lens, and FOV is a maximal field-of-view of the optical imaging lens assembly. Satisfying $|(R1+R2)/(D0s-d0s)|<30.0$, $100.0°<FOV<120.0°$ and $L/[f5\times\tan(FOV/2)]<-1.0$ is conducive to controlling L, FOV and D0s, which minimizes the aberration or stray light caused by the first lens under the premise of ensuring the miniaturization of the structure of the lens assembly. Moreover, the reasonable optimization for the combination of R1, R2 and D0s is conducive to preventing the first lens from protruding outside. When the optical imaging lens assembly satisfies $100.0°<FOV<120.0°$, it is helpful to contain more scenery and information in the picture when shooting, and thus the requirement of shooting a maximal field of view in a limited space can be fulfilled. At the same time, the ultra large field-of-view will cause a picture distortion, and accordingly can be used for the photos of curious senses of picture. In addition, when the optical imaging lens assembly satisfies $L/[f5\times\tan(FOV/2)]<-1.0$, the height of the lens barrel along the direction of the optical axis can be minimized by adjusting the effective focal length of the fifth lens and the maximal field-of view of the optical imaging lens assembly. Accordingly, it is implemented that the size of the lens assembly is reduced as much as possible without significantly weakening the optical performance, thereby achieving a thin and light device.

In the exemplary implementations, the optical imaging lens assembly according to the present disclosure may satisfy: $-3.0<R1/D1s<-0.5$. Here, R1 is the radius of curvature of the object-side surface of the first lens, and D1s is an outer diameter of an object-side surface of the first spacing element. Satisfying $-3.0<R1/D1s<-0.5$ helps to improve the bearing between the lens and the spacing element, thereby improving the assembling stability of the lens assembly.

In the exemplary implementations, the optical imaging lens assembly according to the present disclosure may satisfy: $-3.0<R7/D4s<-0.5$. Here, R7 is a radius of curvature of an object-side surface of the fourth lens, and D4s is an outer diameter of an object-side surface of the fourth spacing element. Satisfying $-3.0<R7/D4s<-0.5$ helps to improve the bearing between the lens and the spacing element, thereby improving the assembling stability of the lens assembly.

In the exemplary implementations, a center thickness of the second lens on the optical axis is greater than 0.4 mm. The optical imaging lens assembly according to the present disclosure may satisfy: $0<d2s/f2<5.0$. Here, f2 is an effective focal length of the second lens, and d2s is an inner diameter of an object-side surface of the second spacing element. Without changing the effective focal length of the lens with a center thickness greater than 0.4 mm, satisfying $0<d2s/f2<5.0$ is conducive to giving the range of the inner diameter of the object-side surface of the spacing element that is at least partially in contact with the lens, to implement the interception and release for the optical path according to requirements, which helps to adjust the relative illumination performance of the lens assembly.

In the exemplary implementations, a center thickness of the fourth lens on the optical axis is greater than 0.4 mm. The optical imaging lens assembly according to the present disclosure may satisfy: $0<d4s/f4<5.0$. Here, f4 is an effective focal length of the fourth lens, and d4s is an inner diameter of the object-side surface of the fourth spacing element. Without changing the effective focal length of the lens with a center thickness greater than 0.4 mm, satisfying $0<d4s/f4<5.0$ is conducive to giving the range of the inner diameter of the object-side surface of the spacing element that is at least partially in contact with the lens, to implement the interception and release for the optical path according to requirements, which helps to adjust the relative illumination performance of the lens assembly.

In the exemplary implementations, the optical imaging lens assembly according to the present disclosure may satisfy: $|R1|>|R2|$, $R3>R4$, $R5>R6$ and $R3<R5$. Here, R1 is the radius of curvature of the object-side surface of the first lens, R2 is the radius of curvature of the image-side surface of the first lens, R3 is a radius of curvature of an object-side surface of the second lens, R4 is a radius of curvature of the image-side surface of the second lens, R5 is a radius of curvature of an object-side surface of the third lens, and R6 is a radius of curvature of the image-side surface of the third lens. When $|R1|>|R2|$, $R3>R4$, $R5>R6$ and $R3<R5$ are satisfied, the control for the shape of the first lens helps to converge the incident light of the lens assembly, and guide the convergent beams to enter the opening of a central diaphragm. Moreover, it also helps to control the light to be capable of entering the fourth lens uniformly after passing through the second lens and the third lens, so as to ensure the brightness uniformity of the image plane.

In the exemplary implementations, there is an air spacing between any two adjacent lenses in the first lens to the fifth lens on the optical axis. Here, an air spacing between the first lens and the second lens on the optical axis is greater than a spacing distance between an image-side surface of the first spacing element and the object-side surface of the second spacing element along the direction of the optical axis. It is helpful to reasonably control the matching tolerance between the positions of the first lens and the second lens and the first spacing element and the second spacing element, to reduce the matching error, thereby improving the assembling precision of the lens assembly.

In the exemplary implementations, the optical imaging lens assembly according to the present disclosure may satisfy: $0<(R1+R2)/EP01-(R1-R2)/(CT1+T12)<10.0$. Here, R1 is the radius of curvature of the object-side surface of the first lens, R2 is the radius of curvature of the image-side surface of the first lens, EP01 is a distance from the object-end surface of the lens barrel to the object-side surface of the first spacing element along the direction of the optical axis, CT1 is a center thickness of the first lens on the optical axis, and T12 is an air spacing between the first lens and the second lens on the optical axis. More specifically, R1, R2, EP01, CT1 and T12 may further satisfy: $1.0<(R1+R2)/EP01-(R1-R2)/(CT1+T12)<6.0$. When $0<(R1+R2)/EP01-(R1-R2)/(CT1+T12)<10.0$ is satisfied, it is helpful to realize the adjustment for the field curvature and peak value of the optical system by adjusting the center thickness of the first lens and the air spacing between the first lens and the second lens, which provides a theoretical reference for the adjustment of the field curvature and peak value.

In the exemplary implementations, the optical imaging lens assembly according to the present disclosure may satisfy: $-5.0<f1/(D1s-d1s)+f1/(D1s+d1s)<0$. Here, f1 is an effective focal length of the first lens, D1s is the outer diameter of the object-side surface of the first spacing element, and d1s is an inner diameter of the object-side surface of the first spacing element. When $-5.0<f1/(D1s-d1s)+f1/(D1s+d1s)<0$ is satisfied, it is helpful to improve the water-ripple stray light of the first spacing element, to reduce the light hitting on the surface in connection with the inner diameter of the object-side surface of the first spacing element in the first spacing element after passing through the first lens, thereby improving the imaging quality of the lens assembly.

In the exemplary implementations, the optical imaging lens assembly according to the present disclosure may satisfy: $0<(R2+R3)/(d1m+d2m)<5.0$. Here, R2 is the radius of curvature of the image-side surface of the first lens, R3 is the radius of curvature of the object-side surface of the second lens, d1m is an inner diameter of the image-side surface of the first spacing element, and d2m is an inner diameter of an image-side surface of the second spacing element. The first spacing element is a component for the connection during the assembling of the first lens and the second lens. Satisfying $0<(R2+R3)/(d1m+d2m)<5.0$ is conducive to controlling the inner diameter of the first spacing element to cause the first spacing element not to block the light, thereby ensuring the completeness of the light passing through. The more complete the light is, the better the imaging quality is. At the same time, the control for this conditional expression helps to increase the contact area of the first spacing element with the first lens and the second lens, thereby improving the assembling stability of the lens assembly.

In the exemplary implementations, the optical imaging lens assembly according to the present disclosure may satisfy: $-10.0<[f1\times\tan(FOV/2)]/d1m<0$. Here, d1m is the inner diameter of the image-side surface of the first spacing element, f1 is the effective focal length of the first lens, and FOV is the maximal field-of-view of the optical imaging lens assembly. Satisfying $-10.0<[f1\times\tan(FOV/2)]/d1m<0$ is conducive to ensuring that the lens assembly satisfies the normal photographing requirements and the inner diameter of the image-side surface of the first spacing element satisfies the assembling requirement. Therefore, the first spacing element cannot be designed to block light. At the same time, it is helpful to ensure that the bandwidth of the object-side surface of the first spacing element will not be too small. Accordingly, the normal photographing can be ensured, and the normal assembling can be implemented.

In the exemplary implementations, the optical imaging lens assembly according to the present disclosure may satisfy: $-20.0<f1/(EP12+CP1)-f2/(EP12+CP2)<-2.0$. Here, f1 is the effective focal length of the first lens, f2 is the effective focal length of the second lens, EP12 is the spacing distance between the image-side surface of the first spacing element and the object-side surface of the second spacing element along the direction of the optical axis, C1 is a maximal thickness of the first spacing element along the direction of the optical axis, and CP2 is a maximal thickness of the second spacing element along the direction of the optical axis. When $-20.0<f1/(EP12+CP1)-f2/(EP12+CP2)<-2.0$ is satisfied, by controlling the effective focal length of the first lens, the effective focal length of the second lens, the thicknesses of the first spacing element and the second spacing element and the spacing distance between the first spacing element and the second spacing element, the spacing distance between the lenses are affected to adjust the degrees of convergence and divergence of light, and finally, the image definition can be effectively affected.

In the exemplary implementations, the optical imaging lens assembly according to the present disclosure may satisfy: $3.0<(N2+N3)/(EP23-CP2-CP3)<20.0$. Here, N2 is a refractive index of the second lens, N3 is a refractive index of the third lens, CP2 is the maximal thickness of the second spacing element along the direction of the optical axis, CP3 is a maximal thickness of the third spacing element along the direction of the optical axis, and EP23 is a spacing distance between the image-side surface of the second spacing element and an object-side surface of the third spacing element along the direction of the optical axis. More specifically, N2, N3, EP23, CP2 and CP may further satisfy: $15.0<(N2+N3)/(EP23-CP2-CP3)<20.0$. When $3.0<(N2+N3)/(EP23-CP2-CP3)<20.0$ is satisfied, it is helpful to control the degree of convergence of light in the second lens and the third lens, to reduce the loss of energy, thereby improving the imaging quality of the optical imaging lens assembly.

In the exemplary implementations, the optical imaging lens assembly according to the present disclosure may satisfy: $2.0<(D2s+d2s)/(CT2+EP12)<9.0$. Here, D2s is an outer diameter of the object-side surface of the second spacing element, d2s is the inner diameter of the object-side surface of the second spacing element, CT2 is the center thickness of the second lens on the optical axis, and EP12 is the spacing distance between the image-side surface of the first spacing element and the object-side surface of the second spacing element along the direction of the optical axis. Satisfying 2.0<(D2s+d2s)/(CT2+EP12)<9.0 is conducive to ensuring the molding of the lens. Moreover, the ratio of the sum of the inner and outer diameters of the second spacing element to the sum of EP12 and CT2 can be ensured. The smaller the ratio is, the easier it is for the second lens to be molded.

In the exemplary implementations, the optical imaging lens assembly according to the present disclosure may satisfy: 0<(D2m+D3s)/(R4+R5)<10.0. Here, D2m is an outer diameter of the image-side surface of the second spacing element, D3s is an outer diameter of the object-side surface of the third spacing element, R4 is the radius of curvature of the image-side surface of the second lens, and R5 is the radius of curvature of the object-side surface of the third lens. Satisfying 0<(D2m+D3s)/(R4+R5)<10.0 helps to ensure the imaging of the optical imaging lens assembly. The imaging light is crossed and converged after being refracted by different lenses, and finally converged at the image plane for imaging. Therefore, the radii of curvature of each lens contribute to the final imaging effect. By controlling the radius of curvature R4 of the image-side surface of the second lens and the radius of curvature R5 of the object-side surface of the third lens, the degrees of bending of the lenses can be reasonably controlled, and thus, the match between the lenses and the spacing elements can be improved in combination with the control for the outer diameters of the second spacing element and the third spacing element, which helps to ensure the stability during the subsequent assembling.

In the exemplary implementations, the optical imaging lens assembly according to the present disclosure may satisfy: 1.0<D1m/R2+D1m/R3<3.0. Here, D1m is an outer diameter of the image-side surface of the first spacing element, R2 is the radius of curvature of the image-side surface of the first lens, and R3 is the radius of curvature of the object-side surface of the second lens. Satisfying 1.0<D1m/R2+D1m/R3<3.0 is conducive to ensuring the performance and imaging quality of the lens assembly. The state of light emitting from the first lens and the second lens can be better controlled, thereby improving the imaging effect of the lens assembly.

In the exemplary implementations, a front-end portion of the lens barrel close to the object side further includes an aperture plane (e.g., the position indicated by K1 in FIG. 2A) forming an inclination angle with the optical axis, the aperture plane is in connection with the object-end surface of the lens barrel, and an angle between the aperture plane and the object-end surface of the lens barrel is in a range of 100° to 130°. The setting of the aperture plane helps to intercept the large-angle light to control the angle of incident light, which enables the optical imaging lens assembly to have an actual incident angle more accurately approach to the theoretical incident angle, thereby reducing the stray light and ghost images in the optical imaging lens assembly and improving the performance of the optical imaging lens assembly.

In the exemplary implementations, the optical imaging lens assembly according to the present disclosure may satisfy: 1.0<(D4s+d4s)/(R9+R10−R8)<5.0. Here, D4s is the outer diameter of the object-side surface of the fourth spacing element, d4s is the inner diameter of the object-side surface of the fourth spacing element, R8 is a radius of curvature of the image-side surface of the fourth lens, R9 is a radius of curvature of an object-side surface of the fifth lens, and R10 is a radius of curvature of an image-side surface of the fifth lens. Satisfying 1.0<(D4s+d4s)/(R9+R10−R8)<5.0 helps to reduce the stray light of the lens assembly. By controlling the inner diameter d4s of the object-side surface of the fourth spacing element, the amount of light entering the fifth lens can be controlled to block the stray light transferred from the object-side surface, which makes the stray light of the optical imaging lens assembly less, thereby improving the imaging quality.

In the exemplary implementations, the above optical imaging lens assembly may further include an optical filter for correcting color deviations and/or a protective glass for protecting a photosensitive element on the image plane. The optical imaging lens assembly according to the above implementations of the present disclosure may use a plurality of lenses, for example, the five lenses described above. By reasonably distributing the refractive powers and surface types of the lenses, the center thicknesses of the lenses, the axial spacing distances between the lenses, etc., the incident light can be effectively converged, the total track length of the imaging lens assembly can be reduced and the processability of the imaging lens assembly can be improved, which makes the production and processing for the optical imaging lens assembly more easy.

In the implementations of the present disclosure, at least one of the surfaces of the lenses is an aspheric surface, that is, at least one of the object-side surface of the first lens to the image-side surface of the fifth lens is an aspheric surface. An aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, the object-side surface and image-side surface of each of the first lens, the second lens, the third lens, the fourth lens and the fifth lens are aspheric surfaces.

Specific embodiments of the optical imaging lens assembly that may be applicable to the above implementations are further described below with reference to the accompanying drawings.

Embodiment 1

Figure 2A:
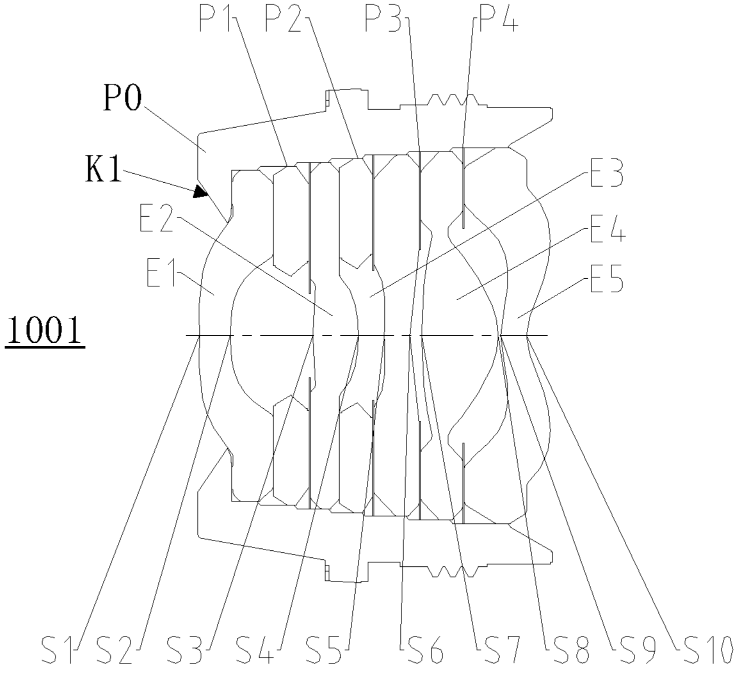
FIGS. 2A-2C are schematic structural diagrams of an optical imaging lens assembly according to Embodiment 1 of the present disclosure.
Figure 2B:
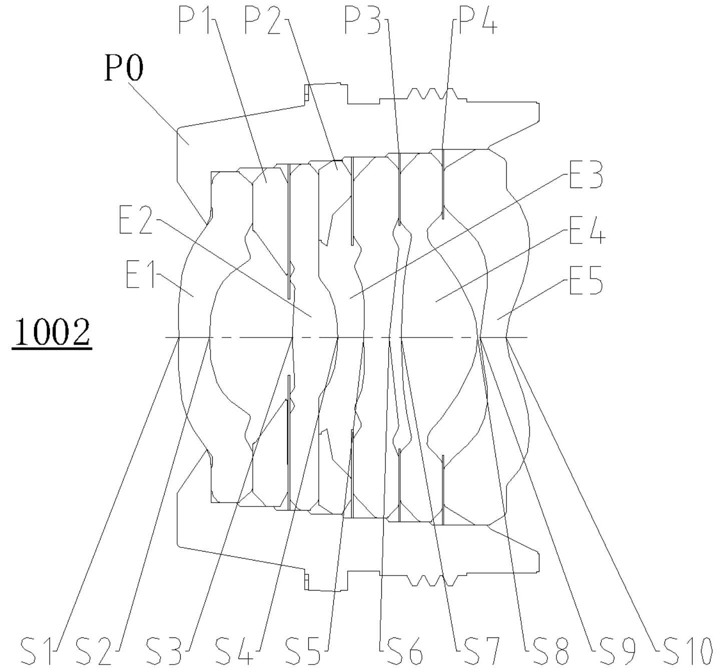
Figure 2C:
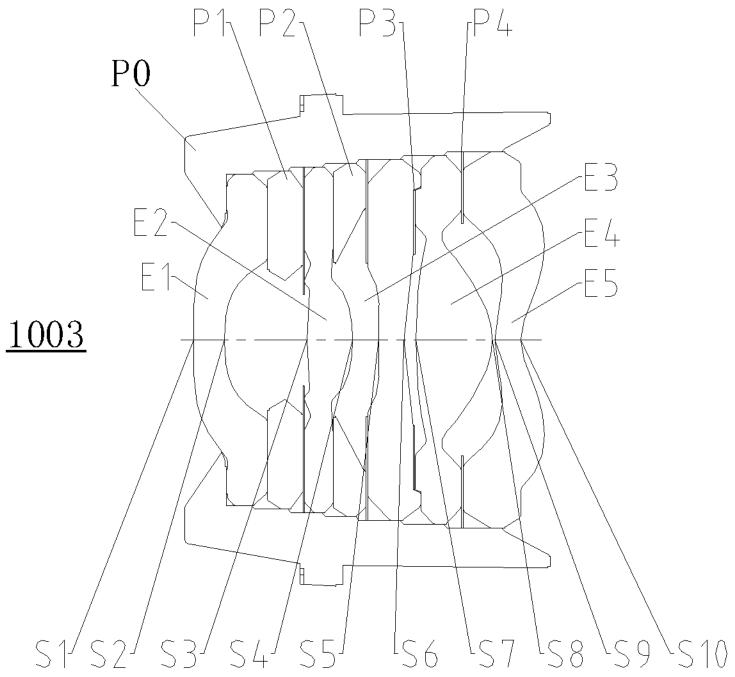

Optical imaging lens assemblies 1001, 1002 and 1003 according to Embodiment 1 of the present disclosure are described below with reference to FIGS. 2A-3D. FIGS. 2A-2C are schematic structural diagrams of the optical imaging lens assemblies 1001, 1002 and 1003 according to Embodiment 1 of the present disclosure.

As shown in FIGS. 2A-2C, the optical imaging lens assemblies 1001, 1002 and 1003 respectively include a lens barrel P0, an imaging lens group E1-E5 and a plurality of spacing elements P1-P4.

As shown in FIGS. 2A-2C, the optical imaging lens assemblies 1001, 1002 and 1003 adopt the same imaging lens group. The imaging lens group includes, sequentially from an object side to an image side, a first lens E1, a second lens E2, a third lens E3, a fourth lens E4 and a fifth lens E5. Here, the first lens E1 has a negative refractive power, and has an object-side surface S1 and an image-side surface S2.

The second lens E2 has a positive refractive power, and has an object-side surface S3 and an image-side surface S4. The third lens E3 has a negative refractive power, and has an object-side surface S5 and an image-side surface S6. The fourth lens E4 has a positive refractive power, and has an object-side surface S7 and an image-side surface S8. The fifth lens E5 has a negative refractive power, and has an object-side surface S9 and an image-side surface S10. An optical filter (not shown) has an object-side surface S11 (not shown) and an image-side surface S12 (not shown). Light from an object sequentially passes through the surfaces S1-S12, and finally forms an image on an image plane S13 (not shown).

Table 1 is a table showing basic parameters of the imaging lens groups of the optical imaging lens assemblies 1001, 1002 and 1003 in Embodiment 1. Here, the units of a radius of curvature, a thickness and an effective focal length are millimeters (mm).

TABLE 1

| | | | | material | | effective | |
|---|---|---|---|---|---|---|---|
| surface number | surface type | radius of curvature | thickness | refractive index | abbe number | focal length | conic coefficient |
| OBJ | spherical | infinite | infinite | | | | |
| S1 | aspheric | −8.8288 | 0.4329 | 1.55 | 56.1 | −4.07 | −99.0000 |
| S2 | aspheric | 3.0226 | 1.1184 | | | | 4.6129 |
| STO | spherical | infinite | 0.0478 | | | | |
| S3 | aspheric | 3.2314 | 0.6416 | 1.55 | 56.1 | 2.43 | −31.7424 |
| S4 | aspheric | −2.0976 | 0.3664 | | | | 3.2115 |
| S5 | aspheric | 4.7800 | 0.3583 | 1.67 | 20.4 | −5.68 | −58.8736 |
| S6 | aspheric | 2.0497 | 0.1674 | | | | −0.6499 |
| S7 | aspheric | 11.9221 | 1.0786 | 1.55 | 56.1 | 1.59 | −97.0874 |
| S8 | aspheric | −0.9046 | 0.0350 | | | | −1.0631 |
| S9 | aspheric | 1.2248 | 0.3645 | 1.67 | 20.4 | −2.53 | −1.0292 |
| S10 | aspheric | 0.6250 | 0.6978 | | | | −2.6145 |
| S11 | spherical | infinite | 0.2100 | 1.52 | 64.2 | | |
| S12 | spherical | infinite | 0.3280 | | | | |
| S13 | spherical | infinite | | | | | |

In this example, the optical imaging lens assemblies 1001, 1002 and 1003 further have the following basic parameters. Effective focal lengths f of the optical imaging lens assemblies 1001, 1002 and 1003 are 1.79 mm, and maximal fields-of-view FOV of the optical imaging lens assemblies 1001, 1002 and 1003 are 104.7°.

In Embodiment 1, the object-side surfaces and the image-side surfaces of the first to fifth lenses E1-E5 are aspheric surfaces, and the surface type x of each aspheric lens may be defined using, but not limited to, the following formula:

$$x = \frac{ch^2}{1 + \sqrt{1 - (k+1)c^2h^2}} + \sum Aih^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S10 in Embodiment 1.

TABLE 2

| surface number | A4 | A6 | A8 | A10 | A12 | A14 | A16 | A18 | A20 |
|---|---|---|---|---|---|---|---|---|---|
| S1 | 5.2613E−01 | −5.6385E−02 | 1.0393E−02 | −4.3739E−03 | 8.1266E−04 | −3.5656E−04 | 8.6171E−05 | −3.2852E−05 | 6.8772E−06 |
| S2 | 2.9951E−01 | 5.5872E−03 | 3.2673E−03 | −1.4045E−03 | −6.0809E−04 | −3.0269E−04 | −1.2055E−04 | −3.2934E−05 | −1.2328E−05 |
| S3 | −1.0515E−02 | −3.6835E−03 | −4.1961E−04 | −7.5026E−05 | 1.2239E−05 | 2.3355E−05 | 1.6449E−05 | 8.3643E−06 | 2.7432E−06 |
| S4 | −6.4710E−02 | −5.4948E−03 | −1.3499E−03 | −3.1719E−04 | −6.3913E−05 | −2.4033E−05 | 2.2804E−07 | 5.4399E−07 | 4.6878E−06 |
| S5 | −1.7726E−01 | 2.8575E−03 | 1.9779E−03 | 9.0531E−05 | 2.9717E−05 | −3.9612E−05 | −2.0348E−05 | −1.3092E−05 | −1.0739E−05 |
| S6 | −2.0825E−01 | 1.8395E−02 | 1.4626E−03 | −5.8763E−04 | 3.5704E−04 | −2.1896E−04 | 3.3059E−05 | −2.9663E−05 | −8.3663E−06 |
| S7 | 8.8600E−02 | −1.9446E−02 | 6.1256E−03 | −2.3960E−04 | 1.6136E−03 | −3.8410E−04 | 1.2207E−04 | −5.6534E−05 | −1.0070E−05 |
| S8 | 2.7262E−01 | −2.4955E−02 | 9.2006E−03 | −9.3663E−04 | 4.7737E−03 | 1.3611E−03 | 6.8655E−04 | 6.6693E−05 | 1.0779E−04 |

TABLE 2-continued

| surface number | A4 | A6 | A8 | A10 | A12 | A14 | A16 | A18 | A20 |
|---|---|---|---|---|---|---|---|---|---|
| S9 | −1.3194E+00 | 1.3345E−01 | −3.5869E−02 | 9.6367E−03 | 2.5955E−03 | −2.3070E−04 | −1.4922E−04 | −2.1546E−04 | 6.3616E−05 |
| S10 | −1.2285E+00 | 1.8509E−01 | −7.3945E−02 | 2.5096E−02 | −7.3220E−03 | 2.2033E−03 | −8.2270E−04 | 4.3077E−04 | −4.7002E−05 |

As shown in FIGS. 2A-2C, the plurality of spacing elements of the optical imaging lens assemblies 1001, 1002 and 1003 are respectively a first spacing element P1, a second spacing element P2, a third spacing element P3 and a fourth spacing element P4. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The plurality of spacing elements described above can block the entry of excess light from the outside, make the lenses better supported against the lens barrel, and enhance the structural stability of the optical imaging lens assemblies 1001, 1002 and 1003.

Table 3 shows basic parameters of the spacing elements and lens barrels of the optical imaging lens assemblies 1001, 1002 and 1003 in Embodiment 1. The units of the parameters in Table 3 are millimeters (mm).

TABLE 3

| parameters in embodiment | optical imaging lens assembly 1001 | optical imaging lens assembly 1002 | optical imaging lens assembly 1003 |
|---|---|---|---|
| d1s | 1.863 | 2.836 | 1.863 |
| d1m | 1.976 | 1.676 | 1.976 |
| D1s | 4.261 | 4.111 | 4.261 |
| D1m | 4.029 | 4.086 | 4.029 |
| d2s | 2.061 | 2.581 | 2.063 |
| d2m | 2.178 | 3.749 | 3.496 |
| D2s | 4.460 | 4.460 | 4.460 |
| D3s | 4.900 | 4.900 | 3.976 |
| d0s | 4.152 | 4.148 | 4.429 |
| D0s | 5.276 | 5.481 | 5.752 |
| EP01 | 1.064 | 1.064 | 1.163 |
| CP1 | 0.500 | 0.502 | 0.501 |
| EP12 | 0.433 | 0.433 | 0.427 |
| CP2 | 0.460 | 0.463 | 0.463 |
| EP23 | 0.663 | 0.663 | 0.668 |
| CP3 | 0.018 | 0.022 | 0.018 |
| D4s | 5.000 | 5.000 | 5.000 |
| d4s | 2.861 | 3.142 | 3.088 |
| D2m | 4.287 | 4.287 | 4.441 |
| L | 5.000 | 5.100 | 5.150 |

Figure 3A:
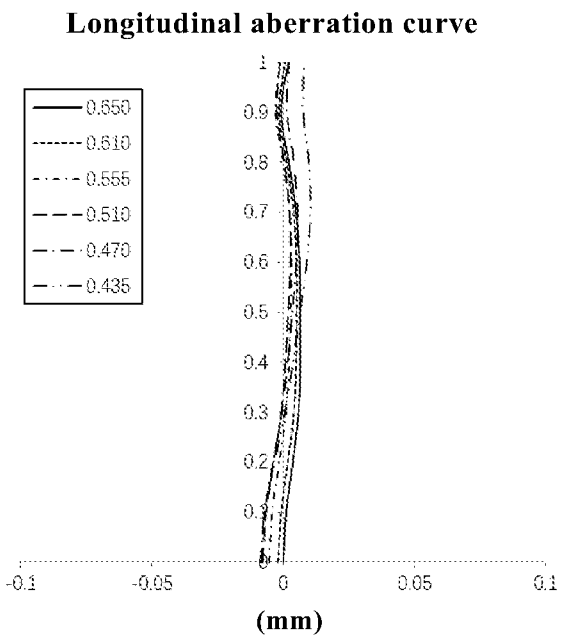
FIGS. 3A-3D respectively illustrate a longitudinal aberration curve, an astigmatic curve, a distortion curve and a lateral color curve of the optical imaging lens assembly according to Embodiment 1 of the present disclosure.
Figure 3B:
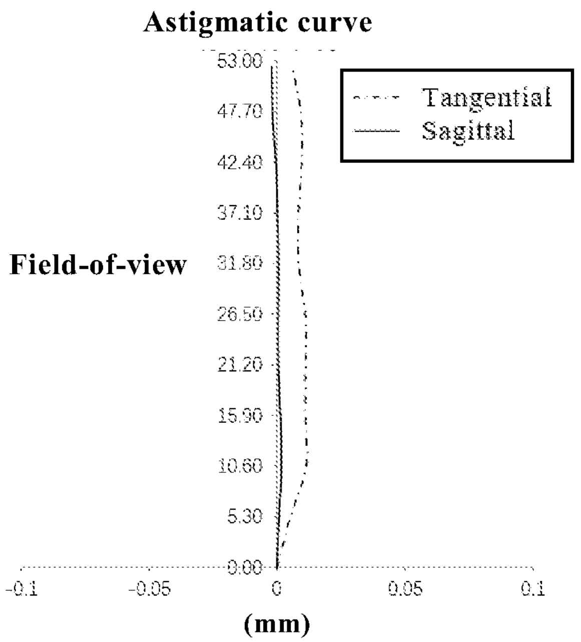
Figure 3C:
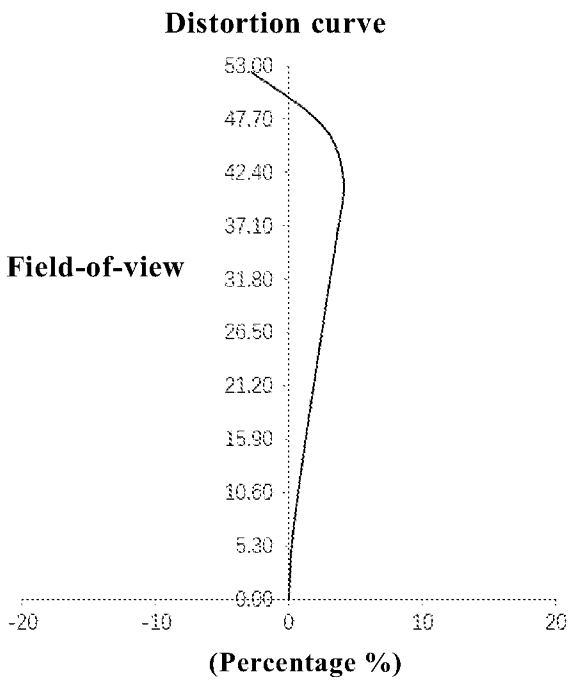
Figure 3D:
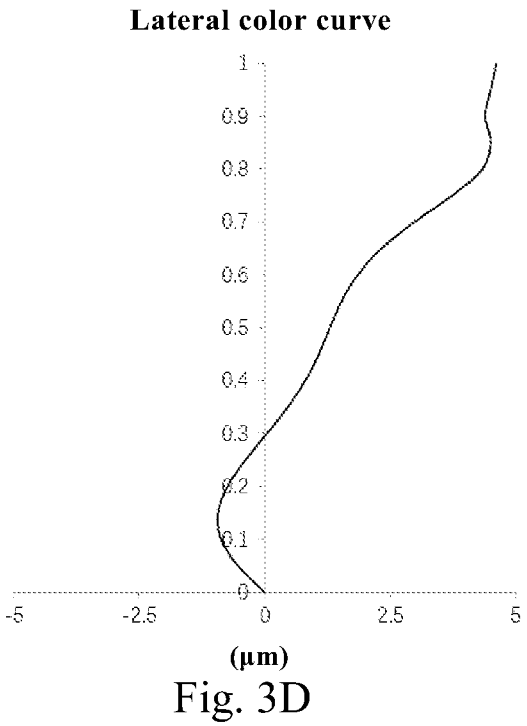

FIG. 3A illustrates longitudinal aberration curves of the optical imaging lens assemblies 1001, 1002 and 1003 according to Embodiment 1, representing deviations of focal points of light of different wavelengths converged after passing through the lens assemblies. FIG. 3B illustrates astigmatic curves of the optical imaging lens assemblies 1001, 1002 and 1003 according to Embodiment 1, representing a curvature of a tangential image plane and a curvature of a sagittal image plane. FIG. 3C illustrates distortion curves of the optical imaging lens assemblies 1001, 1002 and 1003 according to Embodiment 1, representing amounts of distortion corresponding to different fields-of-view. FIG. 3D illustrates lateral color curves of the optical imaging assemblies 1001, 1002 and 1003 according to Embodiment 1, representing deviations of different image heights on the image plane after light passes through the lens assemblies. It can be seen from FIGS. 3A-3D that the optical imaging lens assemblies 1001, 1002 and 1003 given in Embodiment 1 can achieve a good imaging quality.

Embodiment 2

Figure 4A:
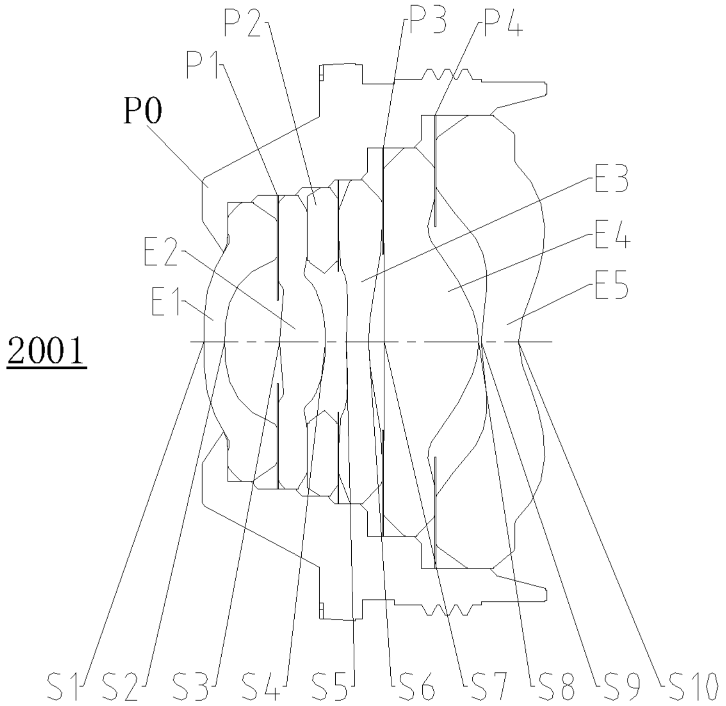
FIGS. 4A-4C are schematic structural diagrams of an optical imaging lens assembly according to Embodiment 2 of the present disclosure.
Figure 4B:
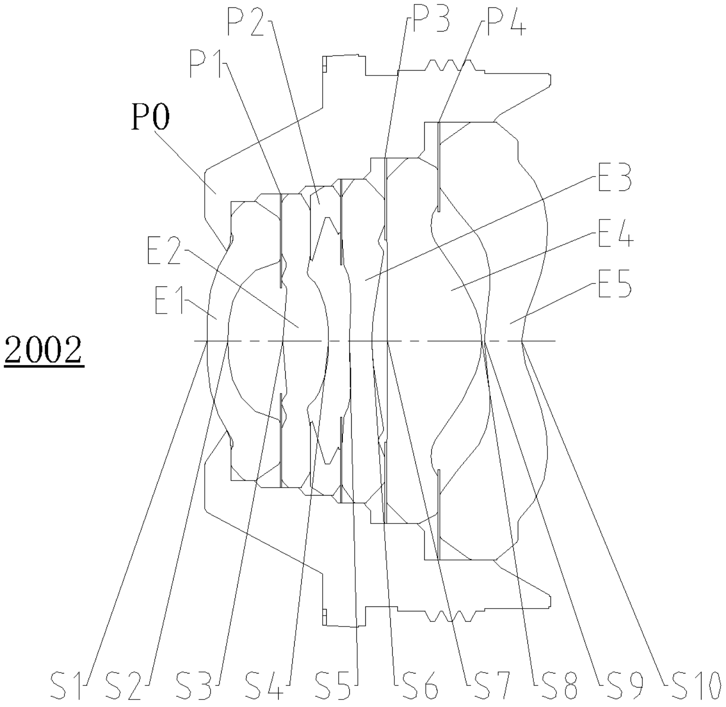
Figure 4C:
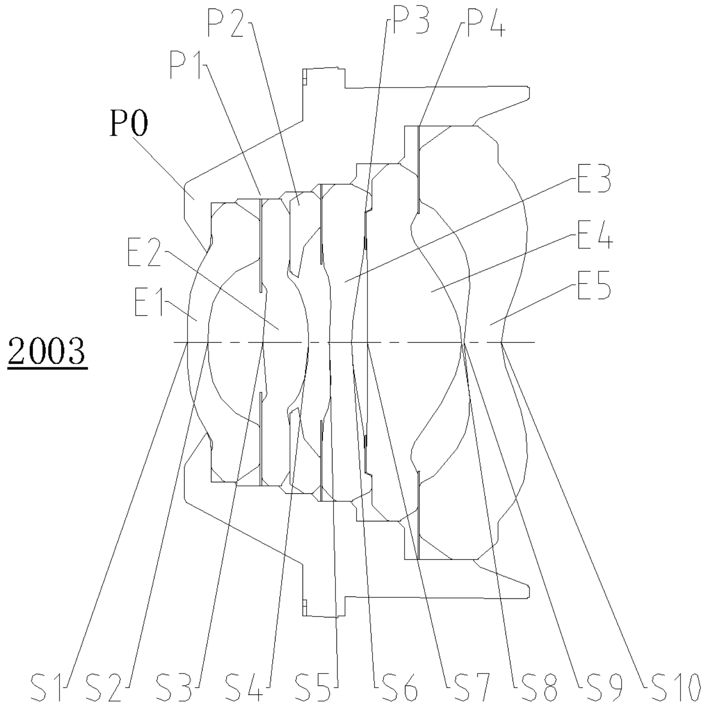

Optical imaging lens assemblies 2001, 2002 and 2003 according to Embodiment 2 of the present disclosure are described below with reference to FIGS. 4A-5D. In this embodiment and the following embodiment, for the sake of brevity, some descriptions similar to those in Embodiment 1 will be omitted. FIGS. 4A-4C are schematic structural diagrams of the optical imaging lens assemblies 2001, 2002 and 2003 according to Embodiment 2 of the present disclosure.

As shown in FIGS. 4A-4C, the optical imaging lens assemblies 2001, 2002 and 2003 respectively include a lens barrel P0, an imaging lens group E1-E5 and a plurality of spacing elements P1-P4.

As shown in FIGS. 4A-4C, the optical imaging lens assemblies 2001, 2002 and 2003 adopt the same imaging lens group. The imaging lens group includes, sequentially from an object side to an image side, a first lens E1, a second lens E2, a third lens E3, a fourth lens E4 and a fifth lens E5. Here, the first lens E1 has a negative refractive power, and has an object-side surface S1 and an image-side surface S2. The second lens E2 has a positive refractive power, and has an object-side surface S3 and an image-side surface S4. The third lens E3 has a negative refractive power, and has an object-side surface S5 and an image-side surface S6. The fourth lens E4 has a positive refractive power, and has an object-side surface S7 and an image-side surface S8. The fifth lens E5 has a negative refractive power, and has an object-side surface S9 and an image-side surface S10. An optical filter (not shown) has an object-side surface S11 (not shown) and an image-side surface S12 (not shown). Light from an object sequentially passes through the surfaces S1-S12, and finally forms an image on an image plane S13 (not shown).

In this example, the optical imaging lens assemblies 2001, 2002 and 2003 further have the following basic parameters. Effective focal lengths f of the optical imaging lens assemblies 2001, 2002 and 2003 are 2.37 mm, and maximal fields-of-view FOV of the optical imaging lens assemblies 2001, 2002 and 2003 are 100.3°.

Table 4 is a table showing basic parameters of the imaging lens groups of the optical imaging lens assemblies 2001, 2002 and 2003 in Embodiment 2. Here, the units of a radius of curvature, a thickness and an effective focal length are millimeters (mm). Table 5 shows the high-order coefficients applicable to the aspheric surfaces in Embodiment 2. Here, the surface type of each aspheric surface may be defined using the formula (1) given in Embodiment 1.

TABLE 4

| surface number | surface type | radius of curvature | thickness | material refractive index | material abbe number | effective focal length | conic coefficient |
|---|---|---|---|---|---|---|---|
| OBJ | spherical | infinite | infinite | | | | |
| S1 | aspheric | 17.0681 | 0.2918 | 1.55 | 56.1 | −6.54 | 30.4525 |
| S2 | aspheric | 2.9342 | 0.7495 | | | | 4.1213 |
| STO | spherical | infinite | 0.0246 | | | | |
| S3 | aspheric | 3.1175 | 0.6474 | 1.55 | 56.1 | 2.57 | −12.0441 |
| S4 | aspheric | −2.3563 | 0.2907 | | | | 1.7340 |
| S5 | aspheric | 3.4342 | 0.3144 | 1.67 | 20.4 | −9.68 | −1.6552 |
| S6 | aspheric | 2.1592 | 0.2224 | | | | −0.1034 |
| S7 | aspheric | −7.6896 | 1.3295 | 1.55 | 56.1 | 1.91 | −42.5109 |
| S8 | aspheric | −0.9728 | 0.0350 | | | | −1.0596 |
| S9 | aspheric | 1.7928 | 0.5245 | 1.67 | 20.4 | −2.41 | −0.7066 |
| S10 | aspheric | 0.7475 | 0.6651 | | | | −3.1412 |
| S11 | spherical | infinite | 0.2100 | 1.52 | 64.2 | | |
| S12 | spherical | infinite | 0.2952 | | | | |
| S13 | spherical | infinite | | | | | |

TABLE 5

| surface number | A4 | A6 | A8 | A10 | A12 | A14 | A16 | A18 | A20 |
|---|---|---|---|---|---|---|---|---|---|
| S1 | 2.7420E−01 | −2.5063E−02 | 9.5278E−04 | −1.5203E−03 | 5.0030E−05 | −6.0295E−05 | 2.1668E−05 | 1.3476E−06 | 8.1888E−06 |
| S2 | 1.8031E−01 | 1.9727E−03 | 1.1281E−03 | −6.0766E−04 | −1.7846E−04 | −8.5887E−05 | −1.0391E−05 | −1.9886E−06 | 6.1325E−06 |
| S3 | −3.5482E−03 | −2.0763E−03 | −3.1321E−04 | −6.0629E−05 | −8.9736E−06 | 3.5970E−06 | 2.6329E−06 | 1.5683E−06 | 1.3455E−07 |
| S4 | −7.9606E−02 | −8.6839E−03 | −3.1550E−03 | −8.1806E−04 | −2.2264E−04 | −5.8506E−05 | −4.9614E−06 | −4.6540E−07 | 2.6955E−06 |
| S5 | −1.7815E−01 | 3.6163E−03 | 8.5519E−04 | −5.0326E−04 | −6.3296E−05 | −7.6651E−05 | 1.1651E−05 | −4.0591E−06 | 5.8837E−06 |
| SE | −1.6141E−01 | 1.2794E−02 | −4.5311E−04 | −1.1666E−03 | 1.5914E−04 | −2.6829E−04 | 5.3407E−05 | −2.4382E−05 | 1.5281E−05 |
| S7 | 9.3846E−02 | −9.1236E−03 | 1.7291E−03 | −1.6204E−03 | 3.8687E−04 | −3.3345E−04 | −3.1506E−05 | −3.1402E−05 | −1.1012E−05 |
| S8 | 3.2413E−01 | −7.2582E−03 | 1.7307E−02 | −2.8943E−03 | 1.6123E−03 | −2.6615E−04 | 2.3765E−04 | −7.0858E−05 | 4.1992E−05 |
| S9 | −1.2728E+00 | 1.0975E−01 | −2.0106E−02 | 6.5169E−03 | 2.3016E−03 | 5.0436E−05 | 3.0112E−04 | −1.5940E−04 | 3.8018E−05 |
| S10 | −1.4256E+00 | 2.0297E−01 | −7.6810E−02 | 2.7359E−02 | −8.7193E−03 | 3.3378E−03 | −1.2141E−03 | 4.4126E−04 | −6.3957E−05 |

As shown in FIGS. 4A-4C, the plurality of spacing elements of the optical imaging lens assemblies 2001, 2002 and 2003 are respectively a first spacing element P1, a second spacing element P2, a third spacing element P3 and a fourth spacing element P4. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The plurality of spacing elements described above can block the entry of excess light from the outside, make the lenses better supported against the lens barrel, and enhance the structural stability of the optical imaging lens assemblies 2001, 2002 and 2003.

Table 6 shows basic parameters of the spacing elements and lens barrels of the optical imaging lens assemblies 2001, 2002 and 2003 in Embodiment 2. The units of the parameters in Table 6 are millimeters (mm).

TABLE 6

| parameters in embodiment | optical imaging lens assembly 2001 | optical imaging lens assembly 2002 | optical imaging lens assembly 2003 |
|---|---|---|---|
| d1s | 1.100 | 1.399 | 1.320 |
| d1m | 1.100 | 1.399 | 1.320 |
| D1s | 3.880 | 3.880 | 3.782 |

TABLE 6-continued

| parameters in embodiment | optical imaging lens assembly 2001 | optical imaging lens assembly 2002 | optical imaging lens assembly 2003 |
|---|---|---|---|
| D1m | 3.880 | 3.880 | 3.782 |
| d2s | 2.150 | 2.152 | 1.864 |
| d2m | 2.140 | 2.854 | 3.032 |
| D2s | 3.843 | 3.842 | 3.743 |
| D3s | 5.132 | 4.831 | 3.436 |
| d0s | 3.227 | 3.255 | 3.283 |
| D0s | 4.222 | 4.440 | 4.130 |
| EP01 | 1.052 | 1.058 | 1.066 |
| CP1 | 0.018 | 0.022 | 0.024 |
| EP12 | 0.400 | 0.400 | 0.400 |
| CP2 | 0.433 | 0.429 | 0.427 |
| EP23 | 0.624 | 0.624 | 0.624 |
| CP3 | 0.018 | 0.022 | 0.018 |
| D4s | 5.981 | 5.781 | 5.724 |
| d4s | 3.045 | 2.406 | 3.400 |
| D2m | 3.791 | 3.791 | 3.775 |
| L | 4.850 | 4.870 | 4.870 |

Figure 5A:
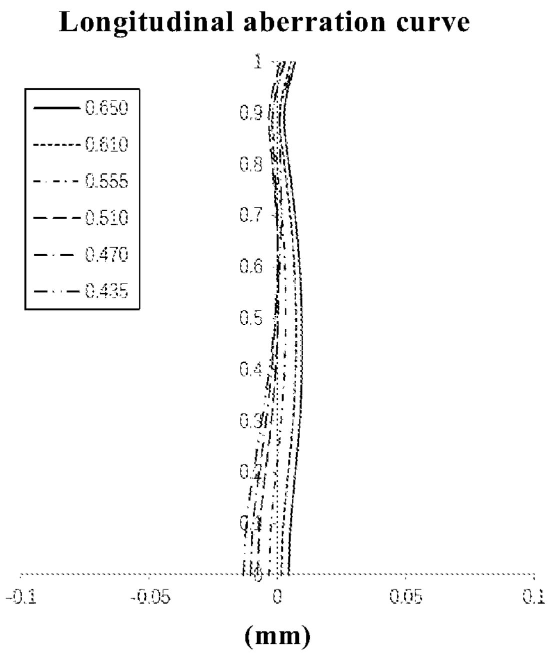
FIGS. 5A-5D respectively illustrate a longitudinal aberration curve, an astigmatic curve, a distortion curve and a lateral color curve of the optical imaging lens assembly according to Embodiment 2 of the present disclosure.
Figure 5B:
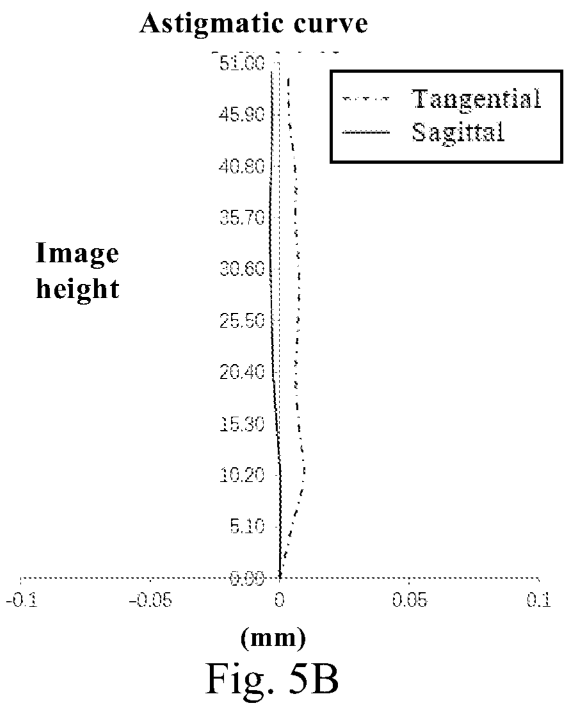
Figure 5C:
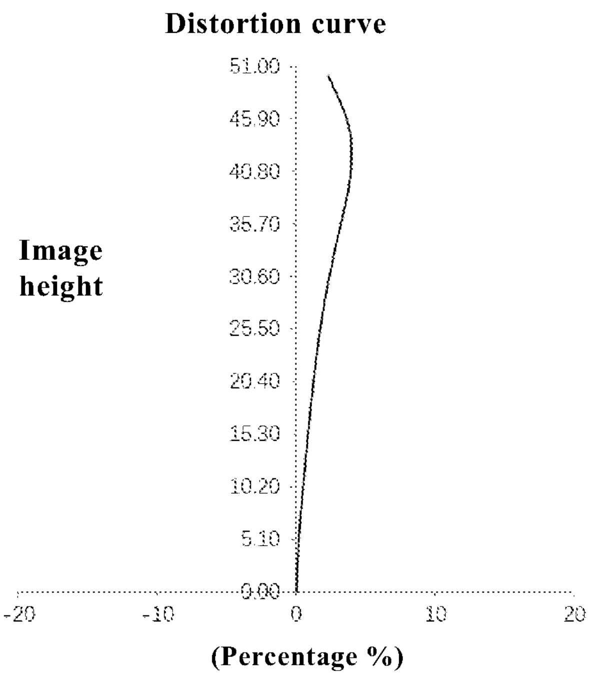
Figure 5D:
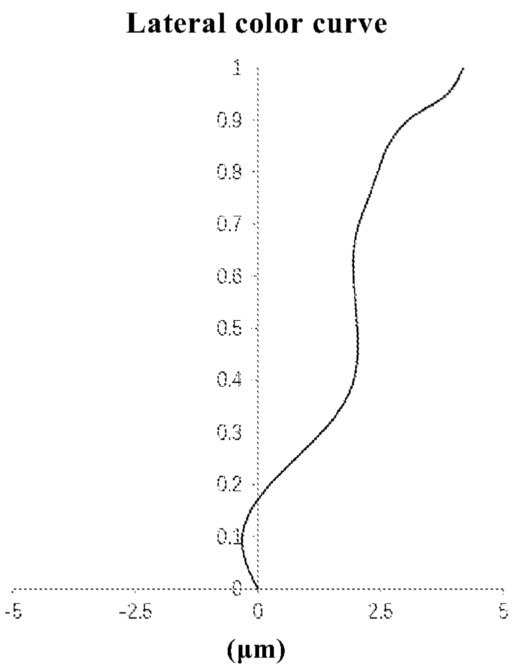

FIG. 5A illustrates longitudinal aberration curves of the optical imaging lens assemblies 2001, 2002 and 2003 according to Embodiment 2, representing deviations of focal points of light of different wavelengths converged after passing through the lens assemblies. FIG. 5B illustrates astigmatic curves of the optical imaging lens assemblies 2001, 2002 and 2003 according to Embodiment 2, representing a curvature of a tangential image plane and a curvature of a sagittal image plane. FIG. 5C illustrates distortion curves of the optical imaging lens assemblies 2001, 2002 and 2003 according to Embodiment 2, representing amounts of distortion corresponding to different image heights. FIG. 5D illustrates lateral color curves of the optical imaging assemblies 2001, 2002 and 2003 according to Embodiment 2, representing deviations of different image heights on the image plane after light passes through the lens assemblies. It can be seen from FIGS. 5A-5D that the optical imaging lens assemblies 2001, 2002 and 2003 given in Embodiment 2 can achieve a good imaging quality.

Embodiment 3

Figure 6A:
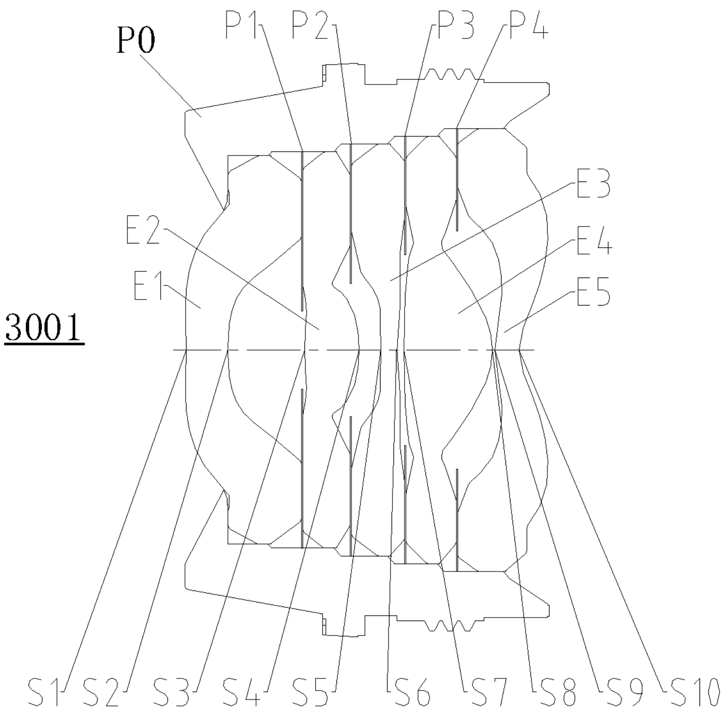
FIGS. 6A-6C are schematic structural diagrams of an optical imaging lens assembly according to Embodiment 3 of the present disclosure.
Figure 6B:
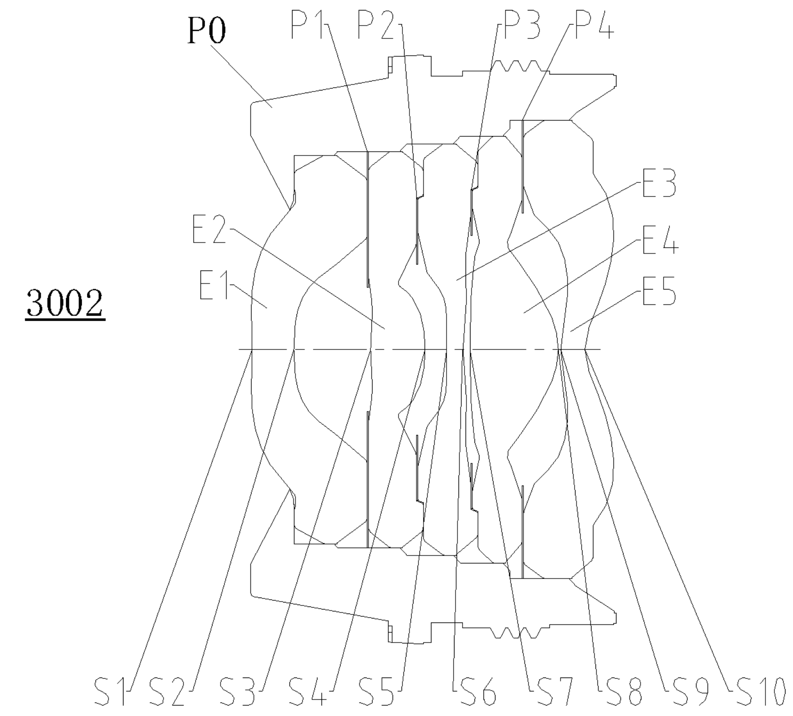
Figure 6C:
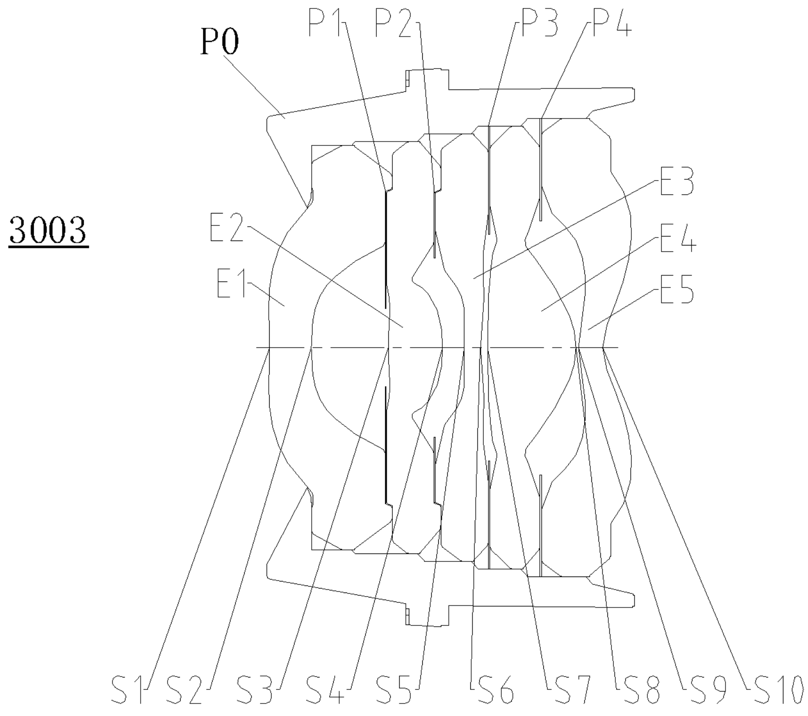

Optical imaging lens assemblies 3001, 3002 and 3003 according to Embodiment 3 of the present disclosure are described below with reference to FIGS. 6A-7D. FIGS. 6A-6C are schematic structural diagrams of the optical imaging lens assemblies 3001, 3002 and 3003 according to Embodiment 3 of the present disclosure.

As shown in FIGS. 6A-6C, the optical imaging lens assemblies 3001, 3002 and 3003 respectively include a lens barrel P0, an imaging lens group E1-E5 and a plurality of spacing elements P1-P4.

As shown in FIGS. 6A-6C, the optical imaging lens assemblies 3001, 3002 and 3003 adopt the same imaging lens group. The imaging lens group includes, sequentially from an object side to an image side, a first lens E1, a second lens E2, a third lens E3, a fourth lens E4 and a fifth lens E5. Here, the first lens E1 has a negative refractive power, and has an object-side surface S1 and an image-side surface S2. The second lens E2 has a positive refractive power, and has an object-side surface S3 and an image-side surface S4. The third lens E3 has a negative refractive power, and has an object-side surface S5 and an image-side surface S6. The fourth lens E4 has a positive refractive power, and has an object-side surface S7 and an image-side surface S8. The fifth lens E5 has a negative refractive power, and has an object-side surface S9 and an image-side surface S10. An optical filter (not shown) has an object-side surface S11 (not shown) and an image-side surface S12 (not shown). Light from an object sequentially passes through the surfaces S1-S12, and finally forms an image on an image plane S13 (not shown).

In this example, the optical imaging lens assemblies 3001, 3002 and 3003 further have the following basic parameters. Effective focal lengths f of the optical imaging lens assemblies 3001, 3002 and 3003 are 1.75 mm, and maximal fields-of-view FOV of the optical imaging lens assemblies 3001, 3002 and 3003 are 117.4°.

Table 7 is a table showing basic parameters of the imaging lens groups of the optical imaging lens assemblies 3001, 3002 and 3003 in Embodiment 3. Here, the units of a radius of curvature, a thickness and an effective focal length are millimeters (mm). Table 8 shows the high-order coefficients applicable to the aspheric surfaces in Embodiment 3. Here, the surface type of each aspheric surface may be defined using the formula (1) given in Embodiment 1.

TABLE 7

| | | | | material | | effective | |
|---|---|---|---|---|---|---|---|
| surface number | surface type | radius of curvature | thickness | refractive index | abbe number | focal length | conic coefficient |
| OBJ | spherical | infinite | infinite | | | | |
| S1 | aspheric | −5.2276 | 0.5864 | 1.55 | 56.1 | −3.89 | −96.1696 |
| S2 | aspheric | 3.7173 | 1.0474 | | | | 2.7361 |
| STO | spherical | infinite | 0.0359 | | | | |
| S3 | aspheric | 3.3841 | 0.7668 | 1.55 | 56.1 | 2.43 | −45.8618 |
| S4 | aspheric | −2.0134 | 0.3053 | | | | 3.2696 |
| S5 | aspheric | 4.8248 | 0.2300 | 1.67 | 20.4 | −8.13 | −99.0000 |
| S6 | aspheric | 2.5028 | 0.0976 | | | | −0.5662 |
| S7 | aspheric | 21.2016 | 1.2462 | 1.55 | 56.1 | 1.58 | −34.8436 |
| S8 | aspheric | −0.8782 | 0.0350 | | | | −1.1038 |
| S9 | aspheric | 1.3147 | 0.3401 | 1.67 | 20.4 | −2.22 | −0.4954 |
| S10 | aspheric | 0.6246 | 0.7299 | | | | −2.6117 |
| S11 | spherical | infinite | 0.2100 | 1.52 | 64.2 | | |
| S12 | spherical | infinite | 0.3576 | | | | |
| S13 | spherical | infinite | 0.0000 | | | | |

TABLE 8

| surface number | A4 | A6 | A8 | A10 | A12 | A14 | A16 | A18 | A20 |
|---|---|---|---|---|---|---|---|---|---|
| S1 | 7.2837E−01 | −6.6399E−02 | 1.5914E−02 | −7.3028E−03 | 8.9854E−04 | −8.2805E−04 | 1.2192E−04 | −6.5421E−05 | 1.0084E−05 |
| S2 | 3.6070E−01 | 9.4653E−03 | 4.4436E−03 | −2.3991E−03 | −1.0483E−03 | −6.0472E−04 | −1.7681E−04 | −3.5366E−05 | 6.6238E−06 |
| S3 | −8.0890E−03 | 2.9676E−03 | −3.3745E−04 | −9.6854E−05 | −1.9888E−05 | −3.1879E−06 | −9.1830E−07 | 1.9388E−07 | 6.6136E−07 |
| S4 | −1.1168E−01 | −8.1996E−03 | −2.8538E−03 | −8.3420E−04 | −2.9435E−04 | −1.1120E−04 | −3.0709E−05 | −1.5702E−05 | −1.1985E−06 |
| S5 | −2.7399E−01 | 5.3194E−03 | 4.3557E−03 | 2.7640E−04 | 8.6458E−05 | −1.3237E−05 | −5.2478E−07 | 2.8246E−08 | −9.8403E−06 |
| S6 | −2.6188E−01 | 3.3332E−02 | −6.2850E−04 | 1.2862E−04 | 1.5717E−04 | −2.4802E−04 | 7.4912E−05 | −3.6608E−05 | −7.0487E−06 |
| S7 | 5.4823E−02 | −1.9937E−03 | 4.0303E−03 | 2.9076E−03 | −3.4624E−04 | −4.7022E−04 | 1.5225E−04 | −1.2600E−04 | 5.9854E−05 |
| S8 | 3.4040E−01 | −1.5789E−02 | 1.4054E−02 | −1.3324E−03 | 5.4417E−03 | 5.9839E−04 | 5.3374E−04 | −1.0520E−04 | 9.5442E−05 |
| S9 | −1.8220E+00 | 1.3586E−01 | −7.4311E−02 | 1.3027E−02 | 9.9251E−04 | −2.9831E−05 | 5.0879E−04 | −2.7527E−04 | 3.8089E−05 |
| S10 | −1.4308E+00 | 2.6449E−01 | −1.0721E−01 | 4.3305E−02 | −1.5595E−02 | 5.2760E−03 | −1.8929E−03 | 6.1575E−04 | −1.2465E−04 |

As shown in FIGS. 6A-6C, the plurality of spacing elements of the optical imaging lens assemblies 3001, 3002 and 3003 are respectively a first spacing element P1, a second spacing element P2, a third spacing element P3 and a fourth spacing element P4. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The plurality of spacing elements described above can block the entry of excess light from the outside, make the lenses better supported against the lens barrel, and enhance the structural stability of the optical imaging lens assemblies 3001, 3002 and 3003.

Table 9 shows basic parameters of the spacing elements and lens barrels of the optical imaging lens assemblies 3001, 3002 and 3003 in Embodiment 3. The units of the parameters in Table 9 are millimeters (mm).

TABLE 9

| parameters in embodiment | optical imaging lens assembly 3001 | optical imaging lens assembly 3002 | optical imaging lens assembly 3003 |
|---|---|---|---|
| d1s | 1.015 | 1.617 | 1.014 |
| d1m | 1.015 | 1.617 | 1.014 |
| D1s | 5.145 | 5.145 | 4.042 |
| D1m | 5.145 | 5.145 | 4.042 |
| d2s | 1.729 | 2.220 | 2.325 |
| d2m | 1.729 | 2.220 | 2.325 |
| D2s | 5.345 | 3.916 | 4.021 |
| D3s | 5.545 | 4.141 | 5.745 |
| d0s | 5.565 | 5.565 | 5.635 |
| D0s | 6.118 | 6.318 | 5.920 |

TABLE 9-continued

| parameters in embodiment | optical imaging lens assembly 3001 | optical imaging lens assembly 3002 | optical imaging lens assembly 3003 |
|---|---|---|---|
| EP01 | 1.646 | 1.642 | 1.666 |
| CP1 | 0.018 | 0.022 | 0.018 |
| EP12 | 0.668 | 0.668 | 0.668 |
| CP2 | 0.018 | 0.018 | 0.018 |
| EP23 | 0.751 | 0.751 | 0.751 |
| CP3 | 0.018 | 0.018 | 0.024 |
| D4s | 5.745 | 5.945 | 5.945 |
| d4s | 3.098 | 3.545 | 3.298 |
| D2m | 5.345 | 3.916 | 4.021 |
| L | 5.140 | 5.150 | 5.180 |

Figure 7A:
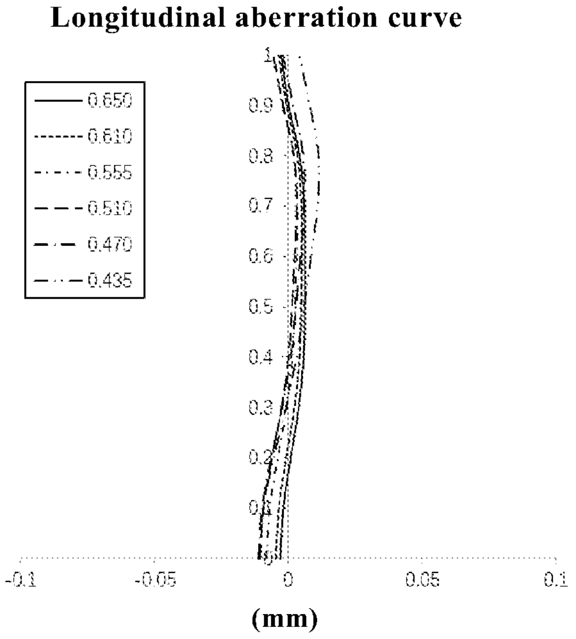
FIGS. 7A-7D respectively illustrate a longitudinal aberration curve, an astigmatic curve, a distortion curve and a lateral color curve of the optical imaging lens assembly according to Embodiment 3 of the present disclosure.
Figure 7B:
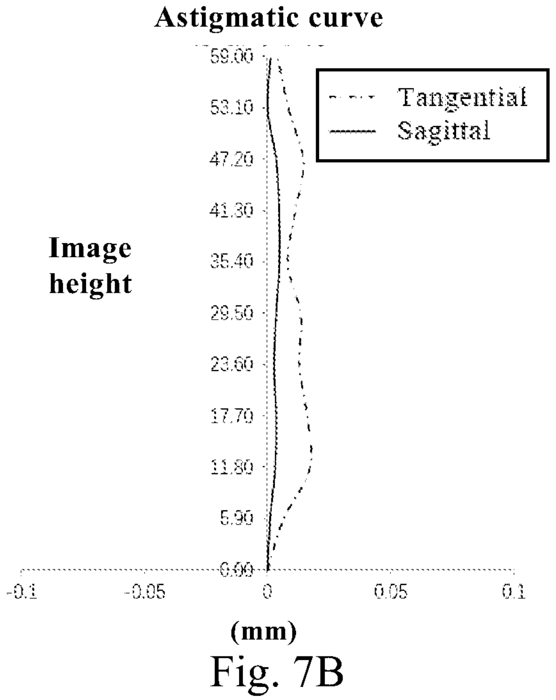
Figure 7C:
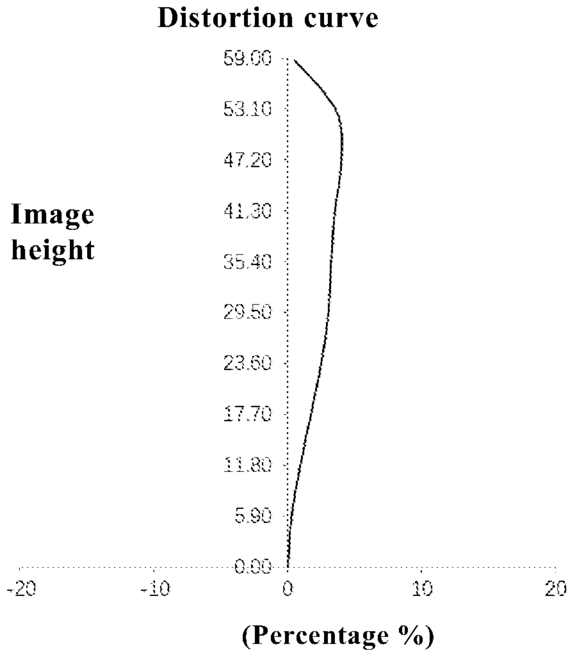
Figure 7D:
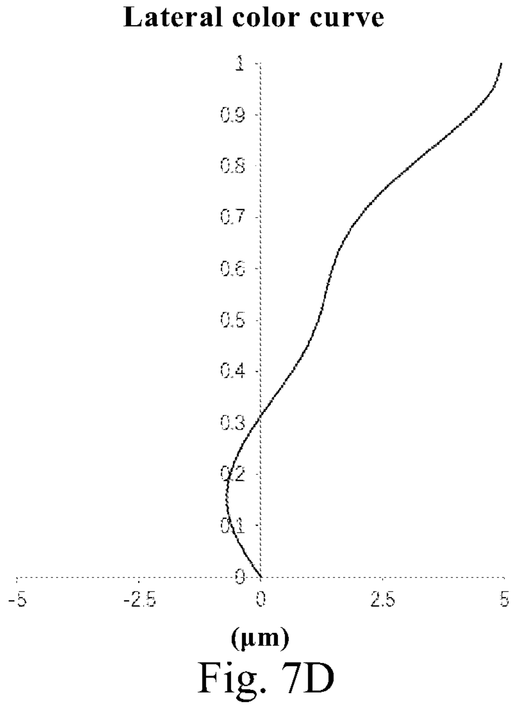

FIG. 7A illustrates longitudinal aberration curves of the optical imaging lens assemblies 3001, 3002 and 3003 according to Embodiment 3, representing deviations of focal points of light of different wavelengths converged after passing through the lens assemblies. FIG. 7B illustrates astigmatic curves of the optical imaging lens assemblies 3001, 3002 and 3003 according to Embodiment 3, representing a curvature of a tangential image plane and a curvature of a sagittal image plane. FIG. 7C illustrates distortion curves of the optical imaging lens assemblies 3001, 3002 and 3003 according to Embodiment 3, representing amounts of distortion corresponding to different image heights. FIG. 7D illustrates lateral color curves of the optical imaging assemblies 3001, 3002 and 3003 according to Embodiment 3, representing deviations of different image heights on the image plane after light passes through the lens assemblies. It can be seen from FIGS. 7A-7D that the optical imaging lens assemblies 3001, 3002 and 3003 given in Embodiment 3 can achieve a good imaging quality.

In summary, the optical imaging lens assemblies 1001, 1002, 1003, 2001, 2002, 2003, 3001, 3002 and 3003 in Embodiments 1-3 satisfy the relationships shown in Table 10.

TABLE 10

| conditional expression/optical imaging lens assembly | 1001 | 1002 | 1003 | 2001 | 2002 | 2003 | 3001 | 3002 | 3003 |
|---|---|---|---|---|---|---|---|---|---|
| L/[f5 × tan(FOV/2)] | −1.52 | −1.55 | −1.57 | −1.68 | −1.69 | −1.69 | −1.40 | −1.41 | −1.42 |
| \|(R1 + R2)/(DOs − dOs)\| | 5.17 | 4.36 | 4.39 | 20.10 | 16.88 | 23.62 | 2.73 | 2.01 | 5.30 |
| Rk/Dns (k = 1, n = 1) | −2.07 | −2.15 | −2.07 | / | / | / | −1.02 | −1.02 | −1.29 |
| Rk/Dns (k = 7, n = 4) | / | / | / | −1.29 | −1.33 | −1.34 | / | / | / |
| dis/fi (i = 2) | 0.85 | 1.06 | 0.85 | 0.84 | 0.84 | 0.73 | 0.71 | 0.91 | 0.96 |
| dis/fi (i = 4) | 1.80 | 1.98 | 1.95 | 1.60 | 1.26 | 1.78 | 1.97 | 2.25 | 2.09 |
| (R1 + R2)/EP01 − (R1 − R2)/(CT1 + T12) | 1.95 | 1.95 | 2.42 | 5.75 | 5.65 | 5.50 | 4.44 | 4.44 | 4.45 |
| f1/(D1s − d1s) + f1/(D1s + d1s) | −2.36 | −3.78 | −2.36 | −3.66 | −3.87 | −3.94 | −1.57 | −1.68 | −2.05 |
| (R2 + R3)/(d1m + d2m) | 1.51 | 1.15 | 1.14 | 1.87 | 1.42 | 1.39 | 2.59 | 1.85 | 2.13 |
| [f1 × tan(FOV/2)]/d1m | −2.67 | −3.15 | −2.67 | −7.12 | −5.60 | −5.93 | −6.31 | −3.96 | −6.31 |
| f1/(EP12 + CP1) − f2/(EP12 + CP2) | −7.09 | −7.07 | −7.12 | −18.72 | −18.59 | −18.52 | −9.22 | −9.19 | −9.22 |
| (N2 + N3)/(EP23 − CP2 − CP3) | 17.41 | 18.09 | 17.22 | 18.61 | 18.61 | 17.99 | 4.50 | 4.50 | 4.54 |
| (D2s + d2s)/(CT2 + EP12) | 6.07 | 6.55 | 6.10 | 5.72 | 5.72 | 5.35 | 4.93 | 4.28 | 4.42 |
| (D2m + D3s)/(R4 + R5) | 3.42 | 3.42 | 3.14 | 8.28 | 8.00 | 6.69 | 3.87 | 2.87 | 3.47 |
| D1m/R2 + D1m/R3 | 2.58 | 2.62 | 2.58 | 2.57 | 2.57 | 2.50 | 2.90 | 2.90 | 2.28 |

The present disclosure further provides an imaging apparatus, of which the electronic photosensitive element may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the scope of the present disclosure is not limited to the technical solution formed by the particular combination of the above technical features. The scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. An optical imaging lens assembly, comprising:

an imaging lens group, composed of a first lens, a second lens, a third lens, a fourth lens and a fifth lens that are sequentially arranged along an optical axis from an object side to an image side;

a first spacing element, placed on an image side of the first lens and is in contact with an image-side surface of the first lens;

a fourth spacing element, placed on an image side of the fourth lens and is in contact with an image-side surface of the fourth lens; and a lens barrel, forming an accommodation space in which the imaging lens group, the first spacing element and the fourth spacing element are accommodated, wherein the lens barrel comprises an object-end surface close to the object side, an image-end surface close to the image side, an inner wall and an outer wall, wherein a number of lenses having refractive powers included in the imaging lens group is five;

wherein an outer diameter D0s of the object-end surface of the lens barrel, an inner diameter dos of the object-end surface of the lens barrel, a radius of curvature R1 of an object-side surface of the first lens and a radius of curvature R2 of the image-side surface of the first lens satisfy: $|(R1+R2)/(D0s-d0s)|<30.0$, wherein a center thickness of the fourth lens on the optical axis is greater than 0.4 mm, and an effective focal length f4 of the fourth lens and an inner diameter d4s of an object-side surface of the fourth spacing element satisfy: $0<d4s/f4<5.0$, wherein an inner diameter d1m of an image-side surface of the first spacing element, an effective focal length f1 of the first lens and a maximal field-of-view FOV of the optical imaging lens assembly satisfy: $-7.12\leq[f1\times\tan(FOV/2)]/d1m<0$, wherein a height L of the lens barrel along a direction of the optical axis, an effective focal length f5 of the fifth lens and the maximal field-of-view FOV of the optical imaging lens assembly satisfy: $100.0°<FOV<120.0°$ and $L/[f5\times\tan(FOV/2)]<-1.0$, and wherein the radius of curvature R1 of the object-side surface of the first lens, the radius of curvature R2 of the image-side surface of the first lens, a radius of curvature R3 of an object-side surface of the second lens, a radius of curvature R4 of an image-side surface of the second lens, a radius of curvature R5 of an object-side surface of the third lens and a radius of curvature R6 of an image-side surface of the third lens satisfy: $|R1|>|R2|$, $R3>R4$, $R5>R6$ and $R3<R5$.

2. The optical imaging lens assembly according to claim 1, wherein the radius of curvature R1 of the object-side surface of the first lens and an outer diameter D1s of an object-side surface of the first spacing element satisfy: $-3.0<R1/D1s<-0.5$; or a radius of curvature R7 of an object-side surface of the fourth lens and an outer diameter D4s of the object-side surface of the fourth spacing element satisfy: $-3.0<R7/D4s<-0.5$.

3. The optical imaging lens assembly according to claim 1, wherein a center thickness of the second lens on the optical axis is greater than 0.4 mm.

4. The optical imaging lens assembly according to claim 3, wherein the optical imaging lens assembly further comprises a second spacing element placed on an image side of the second lens and is in contact with the image-side surface of the second lens, wherein an effective focal length f2 of the second lens and an inner diameter d2s of an object-side surface of the second spacing element satisfy: $0<d2s/f2<5.0$.

5. The optical imaging lens assembly according to claim 1, wherein the optical imaging lens assembly further comprises a second spacing element, placed on an image side of the second lens and is in contact with the image-side surface of the second lens, wherein the radius of curvature R2 of the image-side surface of the first lens, the radius of curvature R3 of the object-side surface of the second lens, the inner diameter dim of the image-side surface of the first spacing element and an inner diameter d2m of an image-side surface of the second spacing element satisfy: $0<(R2+R3)/(d1m+d2m)<5.0$.

6. The optical imaging lens assembly according to claim 1, wherein the optical imaging lens assembly further comprises a second spacing element, placed on an image side of the second lens and is in contact with the image-side surface of the second lens, wherein there is an air spacing between any two adjacent lenses in the first lens to the fifth lens on the optical axis, wherein an air spacing between the first lens and the second lens on the optical axis is greater than a spacing distance between the image-side surface of the first spacing element and an object-side surface of the second spacing element along the direction of the optical axis.

7. The optical imaging lens assembly according to claim 1, wherein the radius of curvature R1 of the object-side surface of the first lens, the radius of curvature R2 of the image-side surface of the first lens, a distance EP01 from the object-end surface of the lens barrel to an object-side surface of the first spacing element along the direction of the optical axis, a center thickness CT1 of the first lens on the optical axis and an air spacing T12 between the first lens and the second lens on the optical axis satisfy: $0<(R1+R2)/EP01-(R1-R2)/(CT1+T12)<10.0$.

8. The optical imaging lens assembly according to claim 1, wherein the effective focal length f1 of the first lens, an outer diameter D1s of an object-side surface of the first spacing element and an inner diameter d1s of the object-side surface of the first spacing element satisfy: $-5.0<f1/(D1s-d1s)+f1/(D1s+d1s)<0$.

9. The optical imaging lens assembly according to claim 1, wherein the height L of the lens barrel along the direction of the optical axis, the effective focal length f5 of the fifth lens and the maximal field-of-view FOV of the optical imaging lens assembly satisfy: $-1.69 \leq L/[f5 \times \tan(FOV/2)] < -1.0$.

10. The optical imaging lens assembly according to claim 1, wherein the optical imaging lens assembly further comprises a second spacing element, placed on an image side of the second lens and is in contact with the image-side surface of the second lens, wherein the effective focal length f1 of the first lens, an effective focal length f2 of the second lens, a spacing distance EP12 between the image-side surface of the first spacing element and an object-side surface of the second spacing element along the direction of the optical axis, a maximal thickness CP1 of the first spacing element along the direction of the optical axis and a maximal thickness CP2 of the second spacing element along the direction of the optical axis satisfy: $-20.0 < f1/(EP12+CP1) - f2/(EP12+CP2) < -2.0$.

11. The optical imaging lens assembly according to claim 1, wherein the optical imaging lens assembly further comprises a second spacing element placed on an image side of the second lens and is in contact with an image-side surface of the second lens, and a third spacing element placed on an image side of the third lens and is in contact with an image-side surface of the third lens, wherein a refractive index N2 of the second lens, a refractive index N3 of the third lens, a maximal thickness CP2 of the second spacing element along the direction of the optical axis, a maximal thickness CP3 of the third spacing element along the direction of the optical axis and a spacing distance EP23 between an image-side surface of the second spacing element and an object-side surface of the third spacing element along the direction of the optical axis satisfy: $3.0 < (N2+N3)/(EP23-CP2-CP3) < 20.0$.

12. The optical imaging lens assembly according to claim 1, wherein the optical imaging lens assembly further comprises a second spacing element placed on an image side of the second lens and is in contact with the image-side surface of the second lens, and a third spacing element placed on an image side of the third lens and is in contact with an image-side surface of the third lens, wherein an outer diameter D2s of an object-side surface of the second spacing element, an inner diameter d2s of the object-side surface of the second spacing element, a center thickness CT2 of the second lens on the optical axis and a spacing distance EP12 between the image-side surface of the first spacing element and the object-side surface of the second spacing element along the direction of the optical axis satisfy: $2.0 < (D2s+d2s)/(CT2+EP12) < 9.0$.

13. The optical imaging lens assembly according to claim 1, wherein the optical imaging lens assembly further comprises a second spacing element placed on an image side of the second lens and is in contact with the image-side surface of the second lens, wherein an outer diameter D2m of an image-side surface of the second spacing element, an outer diameter D3s of an object-side surface of the third spacing element, a radius of curvature R4 of the image-side surface of the second lens and a radius of curvature R5 of the object-side surface of the third lens satisfy: $0 < (D2m+D3s)/(R4+R5) < 10.0$.

14. The optical imaging lens assembly according to claim 1, wherein an outer diameter D1m of the image-side surface of the first spacing element, the radius of curvature R2 of the image-side surface of the first lens and the radius of curvature R3 of the object-side surface of the second lens satisfy: $1.0 < D1m/R2 + D1m/R3 < 3.0$.

15. The optical imaging lens assembly according to claim 1, wherein a front-end portion of the lens barrel close to the object side further comprises an aperture plane forming an inclination angle with the optical axis, the aperture plane is in connection with the object-end surface of the lens barrel, and an angle between the aperture plane and the object-end surface of the lens barrel is in a range of 100° to 130°.

16. The optical imaging lens assembly according to claim 1, wherein an outer diameter D4s of the object-side surface of the fourth spacing element, the inner diameter d4s of the object-side surface of the fourth spacing element, a radius of curvature R8 of the image-side surface of the fourth lens, a radius of curvature R9 of an object-side surface of the fifth lens and a radius of curvature R10 of an image-side surface of the fifth lens satisfy: $1.0 < (D4s+d4s)/(R9+R10-R8) < 5.0$.

17. An optical imaging lens assembly, comprising:

an imaging lens group, composed of a first lens, a second lens, a third lens, a fourth lens and a fifth lens that are sequentially arranged along an optical axis from an object side to an image side;

a first spacing element, placed on an image side of the first lens and is in contact with an image-side surface of the first lens;

a fourth spacing element, placed on an image side of the fourth lens and is in contact with an image-side surface of the fourth lens; and a lens barrel, forming an accommodation space in which the imaging lens group, the first spacing element and the fourth spacing element are accommodated, wherein the lens barrel comprises an object-end surface close to the object side, an image-end surface close to the image side, an inner wall and an outer wall, wherein a number of lenses having refractive powers included in the imaging lens group is five, wherein an outer diameter D0s of the object-end surface of the lens barrel, an inner diameter dos of the object-end surface of the lens barrel, a radius of curvature R1 of an object-side surface of the first lens and a radius of curvature R2 of the image-side surface of the first lens satisfy: $|(R1+R2)/(D0s-d0s)| < 30.0$, wherein a center thickness of the fourth lens on the optical axis is greater than 0.4 mm, and an effective focal length f4 of the fourth lens and an inner diameter d4s of an object-side surface of the fourth spacing element satisfy: $0 < d4s/f4 < 5.0$, wherein an inner diameter dim of an image-side surface of the first spacing element, an effective focal length f1 of the first lens and a maximal field-of-view FOV of the optical imaging lens assembly satisfy: $-7.12 \leq [f1 \times \tan(FOV/2)]/d1m < 0$, wherein the radius of curvature R1 of the object-side surface of the first lens, the radius of curvature R2 of the image-side surface of the first lens, a radius of curvature R3 of an object-side surface of the second lens, a radius of curvature R4 of an image-side surface of the second lens, a radius of curvature R5 of an object-side surface of the third lens and a radius of curvature R6 of an image-side surface of the third lens satisfy: $|R1| > |R2|$, $R3 > R4$, $R5 > R6$ and $R3 < R5$, and wherein a height L of the lens barrel along a direction of the optical axis, an effective focal length f5 of the fifth lens and the maximal field-of-view FOV of the optical imaging lens assembly satisfy: $-1.69 \leq L/[f5 \times \tan(FOV/2)] < -1.0$.

* * * * *